United States Patent [19]

Richardson

[11] Patent Number: 5,590,454

[45] Date of Patent: Jan. 7, 1997

[54] METHOD AND APPARATUS FOR PRODUCING PARTS BY LAYERED SUBTRACTIVE MACHINE TOOL TECHNIQUES

[76] Inventor: Kendrick E. Richardson, 451 N. Main St., P.O. Drawer 230, Six Mile, S.C. 29682

[21] Appl. No.: 361,123

[22] Filed: Dec. 21, 1994

[51] Int. Cl.⁶ ...................................................... B21B 1/42
[52] U.S. Cl. ........................... 29/527.4; 29/928; 29/433; 264/45.1; 264/255; 264/522
[58] Field of Search .................................. 264/255, 45.1, 264/522; 29/527.4, 428, 433

[56] References Cited

U.S. PATENT DOCUMENTS

| | | |
|---|---|---|
| 3,222,776 | 12/1965 | Kawecki . |
| 3,301,725 | 1/1967 | Frontera . |
| 3,539,410 | 11/1970 | Meyer . |
| 3,576,928 | 4/1971 | Barker et al. . |
| 3,660,547 | 5/1972 | Ruekberg . |
| 3,932,923 | 1/1976 | DiMatteo . |
| 3,988,520 | 10/1976 | Riddle . |
| 4,347,202 | 8/1982 | Henckel et al. . |
| 4,393,450 | 7/1983 | Jerard . |
| 4,423,481 | 12/1983 | Reid-Green et al. . |
| 4,424,569 | 1/1984 | Imazeki et al. . |
| 4,430,718 | 2/1984 | Hendren . |
| 4,575,330 | 3/1986 | Hull . |
| 4,651,404 | 3/1987 | Shorrock . |
| 4,665,492 | 5/1987 | Masters . |
| 4,697,240 | 9/1987 | Cedar et al. . |
| 4,704,686 | 11/1987 | Aldinger . |
| 4,719,676 | 1/1988 | Sansone . |
| 4,752,352 | 6/1988 | Feygin . |
| 4,762,654 | 8/1988 | Fuchigami et al. . |
| 4,775,092 | 10/1988 | Edmonds et al. . |
| 4,801,477 | 1/1989 | Fudim . |
| 4,808,361 | 2/1989 | Castro et al. . |
| 4,818,562 | 4/1989 | Arcella et al. . |
| 4,834,929 | 5/1989 | Dehoff et al. . |
| 4,842,186 | 6/1989 | Doyle et al. . |
| 4,844,144 | 7/1989 | Murphy et al. . |
| 4,857,694 | 8/1989 | Doyle et al. . |
| 4,863,538 | 9/1989 | Deckard . |
| 4,868,761 | 9/1989 | Hayashi . |
| 4,879,667 | 11/1989 | Gorski et al. . |
| 4,907,164 | 3/1990 | Guyder . |
| 4,911,353 | 3/1990 | Deakin . |
| 4,929,402 | 3/1990 | Hull . |

(List continued on next page.)

*Primary Examiner*—Carl J. Arbes
*Attorney, Agent, or Firm*—Hardaway Law Firm, PA

[57] ABSTRACT

A method of forming a three-dimensional object (38) is provided using a combination of molding and machining. In its most basic form, the method of the present invention is achieved by depositing a first layer of mold material (40) onto a support surface (20), machining a first cavity (42) into the first layer of mold material, depositing a first layer of construction material (52) onto the first layer of mold material such that an overlapping portion (52a) of the first layer of construction material fills the first cavity to form a first three-dimensional section of the object and such that a superposing portion (52b) of the layer of construction material covers the first layer of mold material, and machining the superposing portion (52b) to form a second three-dimensional section of the object. A larger object may be produced by repeating such steps in like sequence to form additional three-dimensional sections. In the apparatus of the present invention, control of deposition of materials through dispensers (14, 16) and subsequent machining operations by sculpting means (12) is achieved automatically by a director (24) controlled by a computer system (30) comprised of a microprocessor (34) and a CAD/CAM system (36).

14 Claims, 19 Drawing Sheets

U.S. PATENT DOCUMENTS

| | | |
|---|---|---|
| 4,931,234 | 6/1990 | Schad et al. . |
| 4,938,275 | 7/1990 | Leatham et al. . |
| 4,938,816 | 7/1990 | Beaman et al. . |
| 4,942,001 | 7/1990 | Murphy et al. . |
| 4,942,060 | 7/1990 | Grossa . |
| 4,943,928 | 7/1990 | Campbell et al. . |
| 4,944,909 | 7/1990 | Eckardt et al. . |
| 4,945,032 | 7/1990 | Murphy et al. . |
| 4,945,498 | 7/1990 | Mitamura . |
| 4,961,072 | 10/1990 | Sekikawa . |
| 4,961,154 | 10/1990 | Pomerantz et al. . |
| 5,009,585 | 4/1991 | Hirano et al. . |
| 5,011,635 | 4/1991 | Murphy et al. . |
| 5,015,424 | 5/1991 | Smalley . |
| 5,031,120 | 7/1991 | Pomerantz et al. . |
| 5,038,014 | 8/1991 | Pratt et al. . |
| 5,071,503 | 12/1991 | Berman . |
| 5,121,329 | 6/1992 | Crump . |
| 5,136,515 | 8/1992 | Heinski . |
| 5,141,680 | 8/1992 | Almquist et al. . |
| 5,171,360 | 12/1992 | Orme et al. . |
| 5,213,747 | 5/1993 | Lippert ............... 264/255 X |
| 5,260,009 | 11/1993 | Penn ................... 264/255 X |
| 5,374,383 | 12/1994 | Brambach ........... 264/45.1 X |
| 5,490,962 | 2/1996 | Cima et al. .......... 264/255 X |

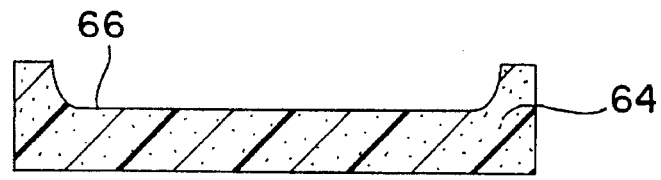
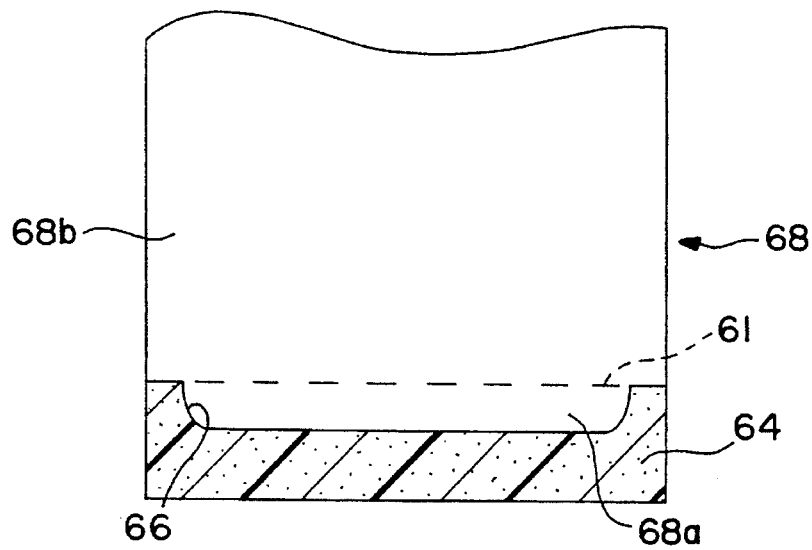
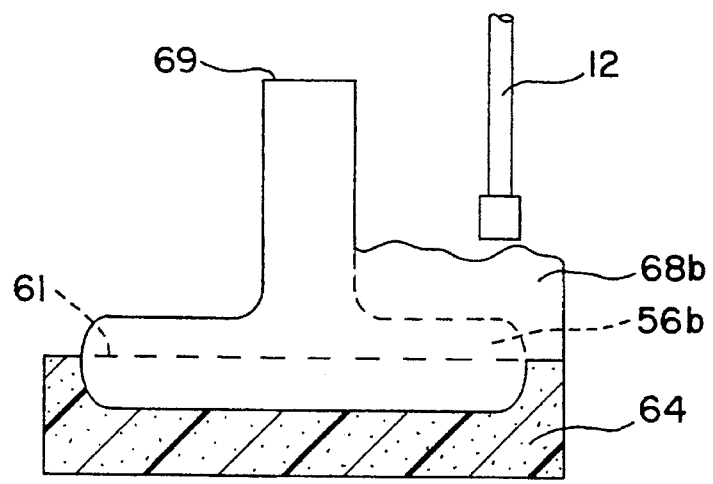

METHOD AND APPARATUS FOR PRODUCING PARTS BY LAYERED SUBTRACTIVE MACHINE TOOL TECHNIQUES

BACKGROUND OF THE INVENTION

1. Field of the Invention

The present invention relates to a method for manufacturing three-dimensional physical structures, in response to computer output, using subtractive tool techniques in a layered fashion. This invention additionally contemplates a computer-aided apparatus that sequentially sculpts a plurality of layers of two dissimilar materials to construct a desired physical structure in a layer-by-layer manner.

2. Description of the Relevant Art

Traditionally, three-dimensional parts have been produced using subtractive machining methods. In such subtractive methods, material is cut away from a starting block of material to produce the desired physical structure. Examples of subtractive machine tool methods include milling, drilling, grinding, lathe cutting, flame cutting, and electric discharge machining. While these conventional machine tool methods are usually effective in producing the desired part, they are deficient in creating some complex geometries. Such methods are usually best suited for producing symmetrical parts and parts where only the exterior is machined. However, where a desired part is unusual in shape or has internal features, the machining becomes more difficult and often the part must be divided into segments requiring subsequent assembly. In many cases, a particular part configuration is not possible because of the limitations imposed upon the tool placement on the part. Thus, the size and configuration of the cutting tool do not permit access of the tool to produce the desired configuration. Additionally, a great deal of human judgement and expertise is typically required to execute conventional machining processes, making such processes relatively slow and expensive.

Various systems for three dimensional modeling have been proposed and/or developed to overcome the limitations inherent in conventional subtractive machining methods. For instance, U.S. Pat. No. 3,932,923 to DiMatteo contemplates the production of a plurality of individual planar elements, corresponding to thin cross sections of the object to be produced, responsive to signals generated from a contour follower. The planar elements are then stacked and physically joined together by various means to form the desired three-dimensional object. This technique has been known to be difficult to apply because an overwhelming number of planar elements may result from high resolution between layers, which may be required for non-uniform three-dimensional objects. The handling of these numerous elements, and the necessity that these elements be precisely stacked to be within tolerances, greatly lengthens production time.

Another method of three dimensional modeling is selective laser sintering, representative teachings of which are found in U.S. Pat. No. 4,863,538 to Deckard and in U.S. Pat. No. 4,938,816 to Beaman et al. That method contemplates the deposition of a powder, such as powdered plastic, in a bounded area to form a powdered layer. This layer, or a selected portion thereof, is then sintered by such means as a laser to bond the affected powder particles of that layer together, thus forming a discrete layer of the three-dimensional object. Successive alternating steps of powder deposition and sintering occur until the three-dimensional object is formed. Drawbacks associated with selective layer sintering include the fact that only a limited range of materials can be used and the inherent dangers presented by the production of toxic gases resulting from the reactions with the powder, coupled with a risk of explosion.

Alternatively, powder particles may be bonded together in a layer by use of a bonding agent, such as a ceramic. This process, known as three dimensional printing and developed at the Massachusetts Institute of Technology by Dr. Emanuel Sachs, is similar to selective laser sintering, except that it contemplates using a printer ink jet mechanism to deposit the bonding agent in a predetermined area of a powder layer, rather than using a laser to sinter the particles together.

Both powder-related techniques suffer from a drawback common to all other prior art three-dimensional forming techniques, with the exception of the aforementioned conventional machining. Namely, such processes are planar in nature, since the parts to be constructed are formed of discrete layers of material. Consequently, a large number of thin layers are required to form an object within given tolerances.

A three-dimensional object may also be formed by ballistic particle manufacturing, a technique taught in U.S. Pat. No. 4,665,492 to Masters. There, a first particle, denominated as an origination seed and constructed of material such as steel or a ceramic, is placed at the origin of a three-dimensional coordinate system. Working heads emit small particles or droplets of, for instance, a ceramic material, according to predetermined coordinates originating from the seed. These particles bond to the seed and to each other, whereby continued emission of droplets in the predetermined manner ultimately produces the three-dimensional object. While a wider array of materials can be used in this technique as opposed to other methods, ballistic particle manufacturing presents inherent tolerance problems because tolerance is a function of droplet size and droplet positioning accuracy, which is difficult to manage. Furthermore, the small droplet size (a droplet may be only a few microns in diameter) results in lengthy production time.

The most widely accepted commercial method of producing a three-dimensional object is known as stereolithography, taught in U.S. Pat. No. 4,575,330 to Hull and in U.S. Pat. No. 4,961,154 to Pomerantz et al. In this method, a bath of a photopolymer liquid is contained in a vessel. Generally, layer-by-layer solidification of predetermined areas of the liquid photopolymer surface is achieved through sequential exposure to a light source, such as a laser. Discrete layers, each newly-formed layer bonding to an immediately preceding layer, are formed until the desired three-dimensional object is produced. As each new layer solidifies, however, a shrinkage in its volume occurs, causing warpage, which leads to stresses in the formed part. These stresses may cause distortions in the part and thus lead to exceeding tolerances. While Pomerantz et al. disclose methods of compensating for the effects of shrinkage, such methods do not prevent shrinkage altogether. Additionally, stereolithography is limited to use of a photopolymer as the material from which the three-dimensional object is ultimately formed. Another disadvantage presented by stereolithography is that reactions with photopolymers frequently produce dangerous toxic gases.

A modified stereolithographic process is taught in U.S. Pat. No. 5,031,120 to Pomerantz et al. There, a photopolymer liquid is supplied only in discrete layers, and a supplied liquid layer, or selected portions thereof, is solidified throughout the entire thickness of the layer, differing from solidifying merely at the surface of a liquid bath, as taught in the aforementioned standard stereolithographic process. Any unsolidified liquid is removed from the layer, such as by vacuuming, and resultant voids in the solidified layer are filled in with a support material, such as wax. The support material is then allowed to solidify, after which time the entire newly-solidified layer is trimmed to a flat, uniform thickness by such means as a machining unit. After such trimming, subsequent layers are formed in like manner until the three-dimensional object is produced. This modified process presents a greater likelihood that an object thereby produced will meet tolerances, since no temporary support web is necessary, unlike the standard process, where such a web must be constructed for any overhangs of the part and then removed by hand. However, it is still subject to the same disadvantages associated with that standard process. Moreover, the machine required to implement the modified stereolithographic process is relatively complex and costly, and the rate of object construction is hindered by the additional steps required in this process.

SUMMARY OF THE INVENTION

It is an important object of the present invention to provide a three-dimensional part production method and apparatus which overcome the foregoing limitations associated with prior art systems.

It is a further object of the present invention to provide a three-dimensional part production method and apparatus which are not dependent upon resolution of object section thickness to attain a given tolerance for the object.

It is a further object of the present invention to provide a three-dimensional object production method and apparatus which combines molding techniques and machining techniques to incrementally produce the three-dimensional object.

These as well as other objects are accomplished by a method of producing a three-dimensional object comprising the steps of depositing a first layer of mold material onto a support surface, machining a first cavity into the first layer of mold material, depositing a first layer of construction material onto the first layer of mold material such that an overlapping portion of the first layer of construction material fills the first cavity to form a first three-dimensional section of the object and such that a superposing portion of the layer of construction material covers the first layer of mold material, and machining the superposing portion of tile first layer of construction material to form a second three-dimensional section of the object.

When additional three-dimensional sections are necessary to complete a three-dimensional object, the process of the present invention contemplates sequentially repeating the following steps until the object is completely formed: (1) depositing a successive layer of mold material onto an immediately preceding three-dimensional section of the object, (2) machining a corresponding cavity into the successive layer of mold material, (3) depositing a successive layer of construction material onto the successive layer of mold material such that an overlapping portion of the successive layer of construction material fills the corresponding cavity to form another three-dimensional section of the object and such that a superposing portion of the successive layer of construction material covers the successive layer of mold material, and (4) machining the superposing portion of the successive layer of construction material to form yet another three-dimensional section of the object.

The aforementioned objects of the present invention are also accomplished by an apparatus for producing a three-dimensional object, comprising sculpting means, a director for positioning the sculpting means in a predetermined area, a mold material dispenser operatively connected to the director, a construction material dispenser operatively connected to the director, and a controller operatively connected to the director, the controller controlling operation of the sculpting means to selectively sculpt mold material and construction material.

In general terms, the "layered subtractive machine tool method" contemplates a new and improved system for making solid objects by successively machining thin layers, or laminae, of mold and construction material. The successive laminae are automatically integrated as they are formed to define the desired three-dimensional object. The mold material often provides a sculpted receptacle into which the construction material is deposited, thereby imparting its negative shape to areas of an object which would otherwise be difficult or impossible to machine by conventional means. Additionally, the positive shapes of portions of the object are formed by machining layers of construction material.

In a presently preferred embodiment, by way of example and not necessarily by way of limitation, the present invention harnesses the principals of computer aided design (CAD) in combination with layered machining, i.e., the use of subtractive machining methods on a layer-by-layer basis for forming three dimensional objects, to simultaneously execute CAD and computer aided manufacturing (CAM) in producing three-dimensional objects directly from computer instruction. Intended applications of the invention include sculpting models and prototypes in a manufacturing system and in a design phase of product development.

The ability to sculpt three dimensional features into each layer makes it possible to work with considerably thicker slices, thereby reducing computational complexity and construction time while increasing part tolerance. Thus, tolerances are not a function of layer thickness but are instead largely dependent on the accuracy of the subtractive machine tool methods. Additionally, the method of the present invention provides flexibility in usable materials; for instance, metals, plastics, waxes, woods, polymers, and composite materials, may be employed as construction and/or mold materials. The term "composite material" is intended to generally include any material made from two discrete substances, and more specifically is used to denote man-made composites, including fiber-reinforced plastics. Composite materials allow a blending of properties of the separate components. With specific reference to fiber-reinforced plastics, such composites combine the high strength and stiffness of the fiber material with the low weight and fracture resistance of the polymeric matrix.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGS. 3B–3H illustrate successive stages in the production of the object illustrated in FIGS. 3 & 3A according to the method of the present invention;

DESCRIPTION OF THE PREFERRED EMBODIMENT

Figure 1:
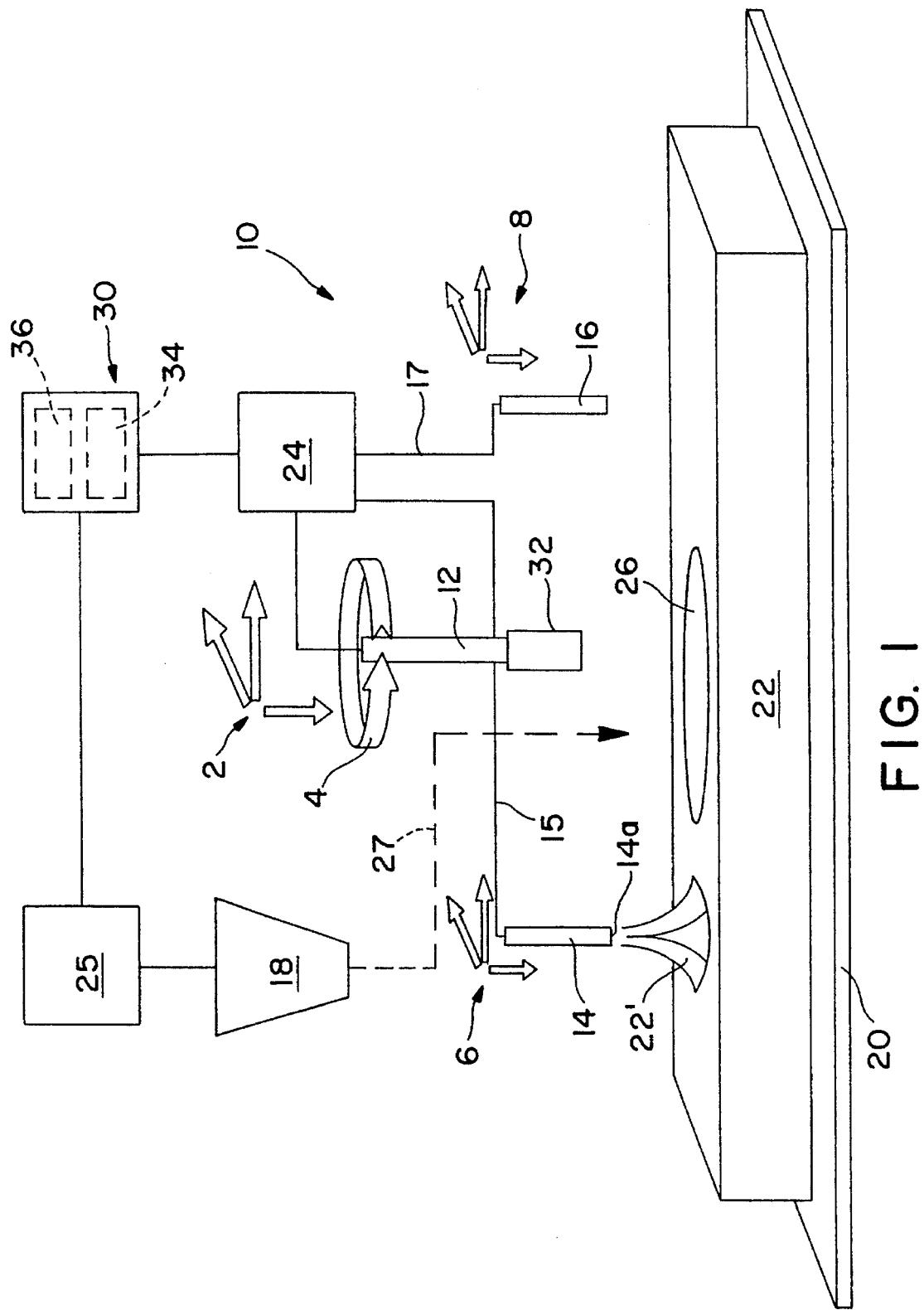
FIG. 1 is a perspective view, partly in schematic, of an apparatus constructed in accordance with a preferred embodiment of the present invention for producing three-dimensional objects.

Depicting the context in which the method of the present invention is executed, FIG. 1 broadly illustrates an apparatus 10 for producing three-dimensional objects which is constructed in accordance with the preferred embodiment of the present invention. Generally, apparatus 10 includes sculpting means 12 capable of moving in the directions indicated by arrows 2 and of rotating in the direction shown by arrow 4, a molding material dispenser 14 capable of moving in the directions indicated by arrows 6, a construction material dispenser 16 capable of moving in the directions indicated by arrows 8, and a waste remover 18. As will be shown with regard to FIGS. 3E & 3G, dispensers 14 & 16 are preferably operable to dispense a plurality of mold materials and construction materials, respectively.

Mold material dispenser 14 is shown dispensing mold material 22' from its outlet 14a. The mold material, as well as construction material, may alternatively be deposited by other means, such as particle beam or particle spray, pouring or spraying of liquids, or deposition of powders for fusing after deposition. The mold material 22' is deposited onto a support surface or platform 20 until an initial layer of mold material 22 is formed. An example of a mold material is a water soluble wax, such as that sold by Yates Investment Casing Wax of Chicago, Ill. under the name 550-GOLD SLAB, B4041. Further examples will be discussed in detail later herein.

A first director 24 is operatively coupled to the sculpting means 12 for positioning the sculpting means in a predetermined area, such as area 26 on the top surface 28 of the initial mold material layer 22. Of course, the area 26 may be three-dimensional, thus forming a cavity within the mold material layer 22.

Like the sculpting means 12, the molding material dispenser 14 and the construction material dispenser 16 may also be operatively coupled to the first director 24. Connections between dispensers 14, 16 and the first director 24 are shown at 15 and 17. Alternatively, dispensers 14, 16 may be unobstructively attached to the milling head of sculpting means 12 to constantly move with means 12. Still further, dispensers 14, 16 could be positioned by a separate director, such as second director 25 which, in turn, could be operatively connected to a second controller such that deposition of materials and machining of previously-deposited material layers could occur simultaneously.

A second director 25, operatively coupled to waste remover 18, may also be provided for directing waste remover 18 in a predetermined path, such as 27, for removing waste material in a manner to be discussed in detail herein.

A controller 30, schematically shown as being operatively coupled to the director 24, controls operation of sculpting means 12 to selectively sculpt deposited layers of both mold material and construction material.

Sculpting means 12 preferably comprises a three-axis computer numerically controlled ("CNC") milling machine with tool changing ability, manufactured by Bridgeport Machines, Inc. of Bridgeport, Conn. as Model No. 760/22 DX. Sculpting means 12 preferably includes a fixture (not shown) for holding a plurality of interchangeable cutting tools, such as at 32, a cutting tool changer apparatus (not shown), and a cutting motor (not shown) for turning tool 32. To provide quick and efficient production of an object within tolerances, the cutting tool 32 may be automatically changed during operation such that a tool size and shape appropriate to the geometry being constructed may be used. For example, a small spherical tool may be appropriate for small curved details, a small cylindrical tool may be appropriate for small vertical walled details, and a larger tool of an appropriate geometry may be used for roughing in of the shape or for areas requiring lesser detail. This ability allows production of parts with area specific tolerances.

First director 24 preferably comprises a system of stepper motors, worm gears, and linear sliders (not shown) for positioning the sculpting means 12 in three dimensions. The type and power of sculpting means 12, the stepper motors, and the cutting motor is dependent upon many factors, and in particular upon the type of materials being dispensed and the desired tolerance of the part being produced. Second director 25 likewise comprises a system of stepper motors, worm gears, and linear sliders to move waste mover 18 in a predetermined path.

The controller 30 preferably comprises a computer which is operatively connected not only to first director 24, as previously described, but also to second director 25 for controlling waste remover 18. Additionally, by virtue of the connections 15 and 17 to the first director 24, controller 30 controls deposition of both mold material and construction material. The computer comprising controller 30 preferably incorporates a microprocessor 34 for controlling all of the aforementioned functions and a CAD/CAM system 36 for generating dimensional data for the object to be produced. Computer/controller 30 is preferably capable of monitoring a position of sculpting means 12 during its removal of extraneous material and is programmed with information indicative of predetermined boundaries of a plurality of three-dimensional sections of the object to be produced.

The production of various examples of three-dimensional objects will now be described, with reference to the remaining figures.

Figure 2:
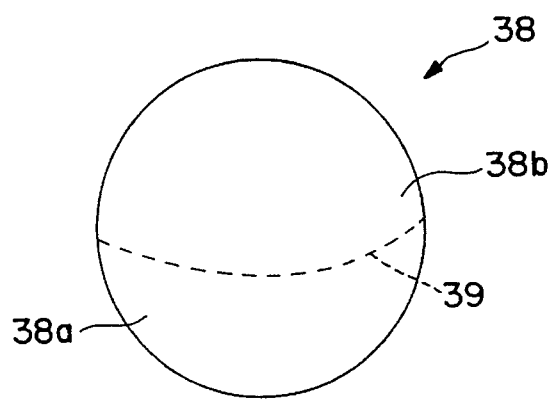
FIG. 2 is a perspective view of a sphere.

FIG. 2 illustrates a first example part, a sphere 38, the construction of which involves the least amount of steps in a method of the present invention. Sphere 38 is comprised of first and second three-dimensional sections 38a and 38b, respectively, these sections being distinguished by imaginary equator 39, integrally joined to one another, and formed as described below.

Figure 2A:
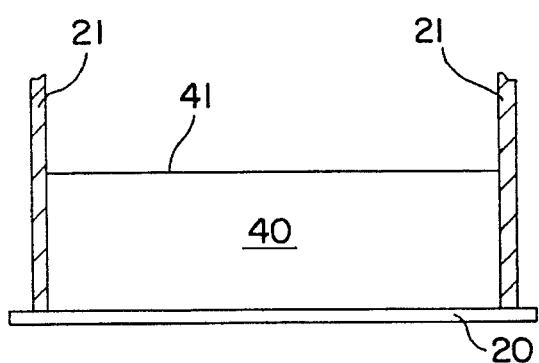
FIGS. 2A–2F illustrate successive stages in the production of the sphere illustrated in FIG. 2 according to the method of the present invention.

In FIG. 2A, a first layer of mold material 40, corresponding to layer 22 in FIG. 1, has been deposited onto platform 20 by mold material dispenser 14. The layer 40 is deposited on platform 20 either in a solid form or as a liquid which is caused to solidify upon or shortly after deposition. The solidification of this layer may be caused by, but not limited to, thermal, radiation, or chemical methods. A smooth upper surface 41 may be obtained by machining if desired. Vertical walls 21 may be provided on either side of layer 40 to act as a mold material container in conjunction with platform 20. These walls may be sections of a cylindrical wall or may be walls of a rectangular enclosure. Such an arrangement is particularly desirable where the viscosity of the mold material or construction material in its liquid phase is relatively low, or where curing times are relatively long.

Figure 2B:
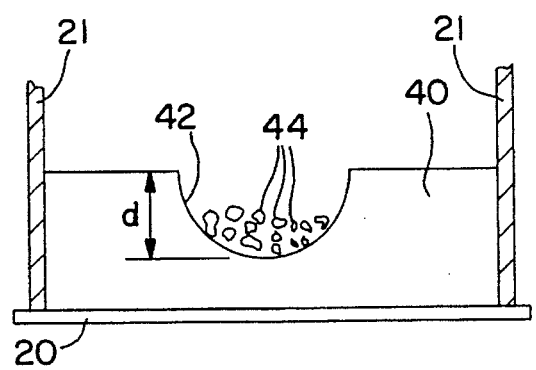

Subsequent to the deposition and solidification of layer 40, subtractive machine tool methods are used to three-dimensionally sculpt the mold material into a geometry specified by the computer control system. FIG. 2B illustrates layer 40 as having been machined or sculpted such that a cavity 42 has been formed therein. The depth "d" of cavity 42 is equal to the radius of sphere 38. Waste particles 44 resulting from the machining of cavity 42 are shown to be lying in the bottom portion thereof.

In the remaining figures to be described, although platform 20 and vertical walls 21 will not be therein shown, it is understood that any initial layer of mold material will be considered to have been deposited upon platform 20 and within vertical walls 21 where desirable.

Figure 2C:
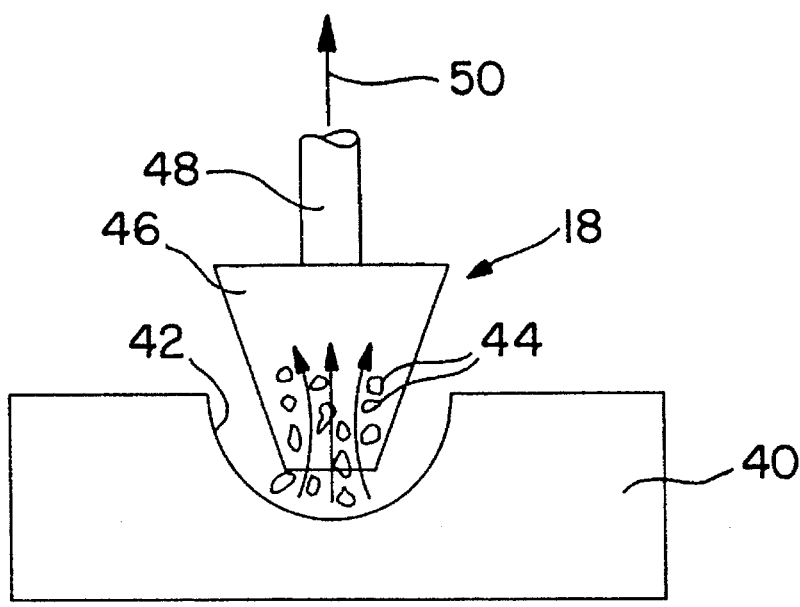

FIG. 2C illustrates removal of waste particles 44 from machined cavity 42 by waste remover 18. Preferably, waste remover 18 comprises a vacuum head 46 connected to a suitable conduit 48 for conducting the particles 44 in the direction shown by arrow 50. Second director 25 (FIG. 1) is constructed so as to direct remover 18 not only to the area of cavity 42 but also to any upper surface of layer 40, such as surface 41. Alternatively, waste removal may be facilitated by use of a directed air stream which would serve to push any debris off the layer 40. As a further alternative means of removing waste particles, surfaces of layer 40 may be swept by an automated brush. Additionally, if particles 44 are comprised of a metallic material, waste removal may be facilitated by magnetic or electrostatic attraction. Any combination of the above methods may be employed to accomplish waste removal.

Figure 2D:
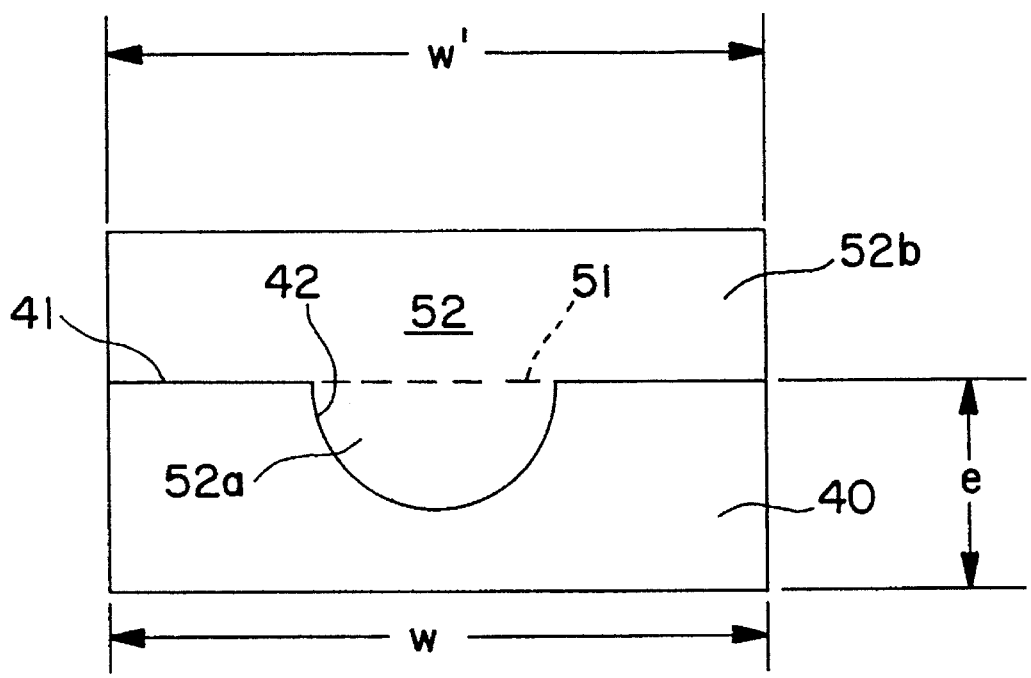

FIG. 2D shows a layer of construction material 52 as having been deposited upon mold material layer 40. An overlapping portion 52a of layer 52 is shown as having filled cavity 42, thereby forming first three-dimensional section 38a of sphere 38 (FIG. 2). As used herein, the term "overlap" and variations thereof, as distinguished from the prior art "discrete level" terminology, mean that the deposition or machining of mold or construction materials may occur below elevations of upper surfaces of previously deposited layers. For specific example, following deposition of layer 40, subsequent process steps were not directed merely to areas at or above elevation "e" of surface 41 of layer 40: machining of cavity 42 to depth "d" (FIG. 2B) occurred below elevation "e", and a portion of the subsequently-added construction material layer 52 flowed below elevation "e", into cavity 42.

Additionally shown in FIG. 2D, a superposing portion 52b of layer 52 is shown to cover layer 40. As used herein, the term "cover" and variations thereof mean that one superposing layer need only interface with a segment of the upper surface of another layer. For specific example, although FIG. 2D shows the width w' of layer 52 extending the full width w of layer 40 for simplicity of illustration, thus showing an interface between layer 52 and the full length of surface 41, such a width magnitude is not always necessary. Depending on the dimension of the next three-dimensional section to be produced, width w' may be less than width w. All that is required for layer 52 to "cover" layer 40 is that there be an interface between layer 52 and a portion of upper surface 41 of layer 40.

An imaginary line 51 is shown in FIG. 2D for purposes of illustration to divide the construction material layer 52 into the portions 52a, 52b. The construction material layer 52 may comprise a machinable wax, such as that sold by Yates Investment Casing Wax of Chicago, Ill. under product number B-3096. It is contemplated however, that other compositions may be used as construction material, so long as such compositions possess suitable physical strength, stiffness, flexibility, and resistance to thermal degradation.

Figure 2E:
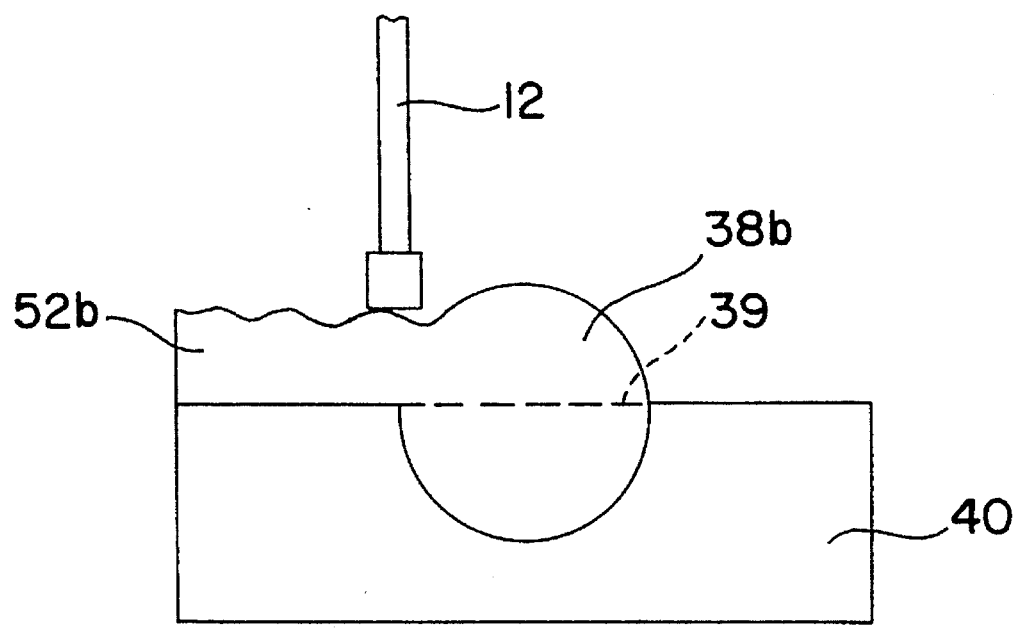
Figure 2F:
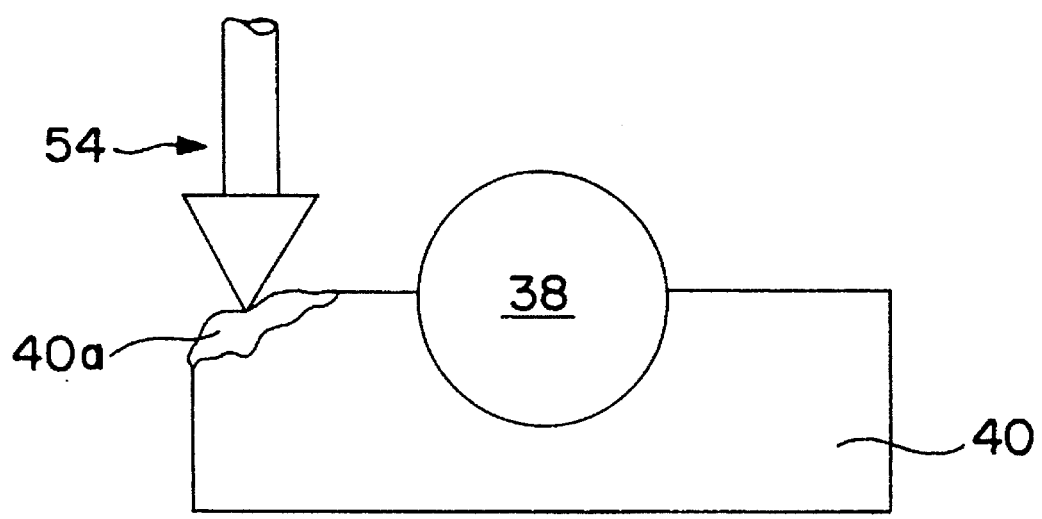

FIG. 2E depicts the machining of superposing portion 52b of construction material layer 52 by sculpting means 12, thereby forming the second three-dimensional section 38b of sphere 38. Upon completion of this machining step and after any necessary removal of waste particles in the manner described with regard to FIG. 2C, the completed sphere 38, partially encased in the mold material layer 40, emerges, as shown in FIG. 2F.

Mold material removal is performed following completion of the last three-dimensional section of an object. The molding material 40 may be removed, or separated from sphere 38, physical means, radiation (electrical, UV, thermal, ultraviolet, etc.), ultrasonic, vibration, electrical induction, or other means or methods such that the construction material is not comprised. FIG. 2F illustrates an early stage of mold material removal, wherein a heating device 54 begins to reduce layer 40 to a liquid mass 40a. Complete removal of layer 40 results in an isolated completed sphere 38 (FIG. 2). Although removal of the mold material layer 40 is shown for purposes of illustration in FIG. 2F as being accomplished by the heating device 54, it must be kept in mind that such means would not be used where the layer 40 is a water soluble wax and where the construction material layer 52 is a machinable wax, since these materials possess similar melting points. Instead, removal of such mold material would be accomplished merely by dissolving the mold material in water.

It is understood that all machining steps subsequently mentioned herein will be considered as having been performed in like manner to the machining steps described with regard to FIGS. 2B & 2E. It is additionally understood that any subsequently described step of mold material removal will encompass the means discussed with regard to FIG. 2F. Moreover, although waste particle removal will not be discussed with regard to the remaining figures, it is understood that waste removal according to the means discussed with regard to FIG. 2C may occur subsequent to machining of any layer of mold or construction material and before the deposition of a subsequent mold or construction material layer.

Figure 3:
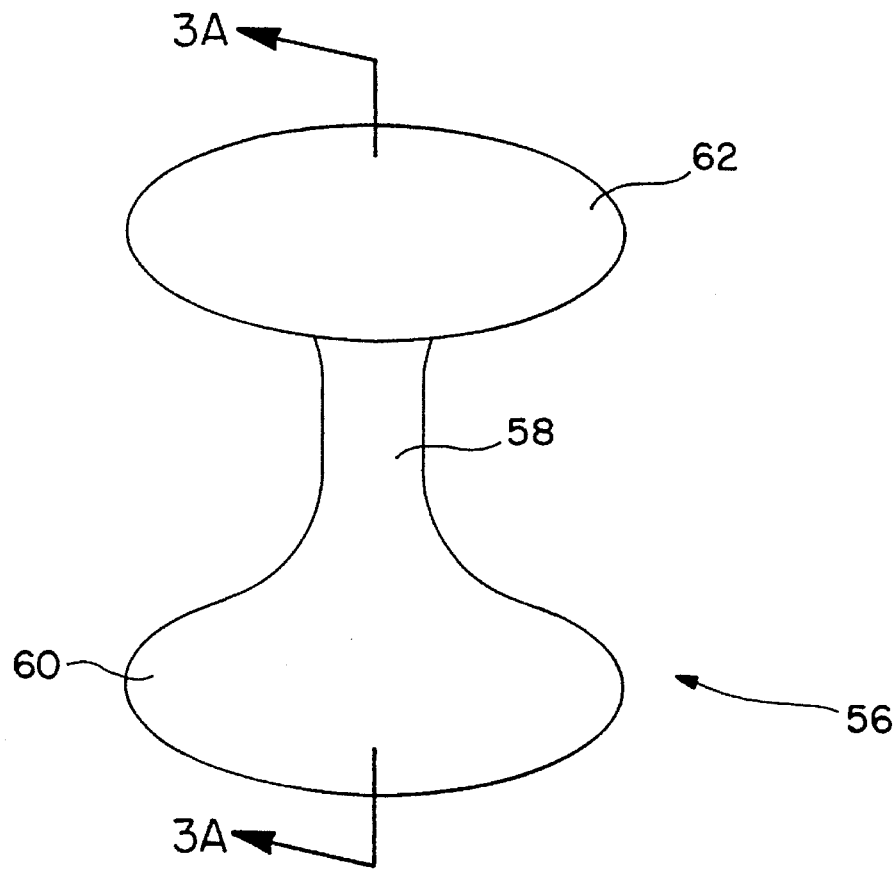
FIG. 3 is a perspective view of another three-dimensional object.

The method of the present invention may be employed to produce three-dimensional objects possessing a more complex shape than that of the sphere 38 of FIG. 2. For instance, FIG. 3 illustrates a rounded barbell-shaped three-dimensional object 56 comprised of a neck portion 58 terminating in end members 60, 62 at either end thereof.

Figure 3A:
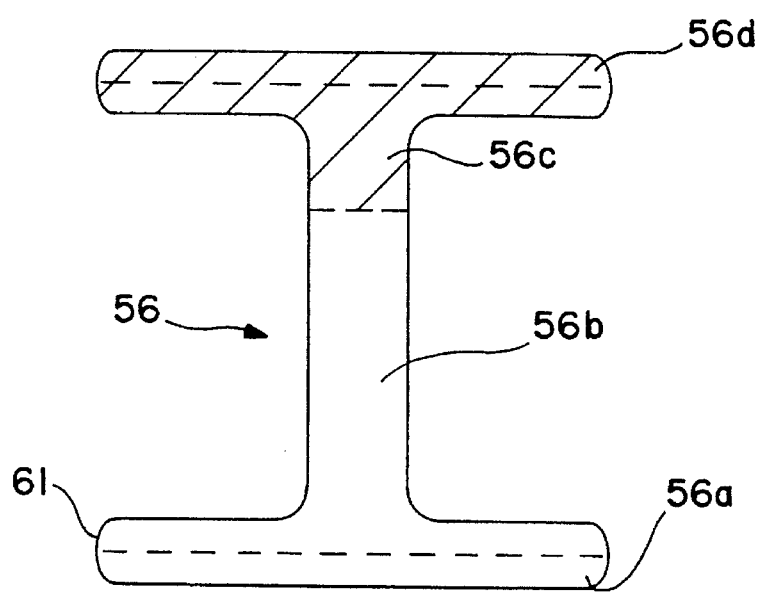
FIG. 3A is a sectional elevation view taken along line 3A—3A of FIG. 3.

As seen in FIG. 3A, object 56 may be subdivided into several predetermined three-dimensional sections 56a, 56b, 56c, and 56d. The thickness and placement of these sections are parameters which are programmed into CAD/CAM system 36 of computer 30 (FIG. 1), and these parameters may vary according to the desired object characteristics, such as materials, tolerances, and speed of construction. As seen in FIG. 3A, the composition of sections 56c, 56d differs from that of sections 56a, 56b. It is also seen that if object 56 were to be wholly produced by conventional machining techniques, an operator would have difficulty in properly positioning a tool below the overhanging shape formed by end member 62. Thus, only section 56d could be produced in such a manner without encountering significant difficulty.

In FIG. 3B, a first layer of mold material 64 has been deposited onto a support surface in the same manner described with regard to FIG. 2A. Additionally, a first cavity 66 is shown as having been machined into layer 64.

In FIG. 3C, a first layer of construction material 68 is shown as having been deposited onto the first layer of mold material 64. An overlapping portion 68a of layer 68 is shown as having filled the first cavity 66, thereby forming first three-dimensional section 56a of object 56 (FIG. 3A). Additionally, a superposing portion 68b of layer 68 is shown to cover mold material layer 64. An imaginary line 61 is shown for purposes of illustration to divide the first construction material layer 68 into the portions 68a, 68b.

FIG. 3D depicts sculpting means 12 machining superposing portion 68b of the first construction material layer 68, thereby forming the second three-dimensional section 56b of object 56. The outline of the portion of section 56b yet to be formed in FIG. 3D is shown in phantom lines. The height of section 56b illustrates that an object produced by the process of the present invention need not be formed in a plurality of equally-thin planar sections, as required by prior art processes, thus greatly increasing the speed of production. To provide a smooth surface to facilitate further construction, upper end 69 of section 56b may be further machined using any tool which levels the surface of end 69.

Figure 3E:
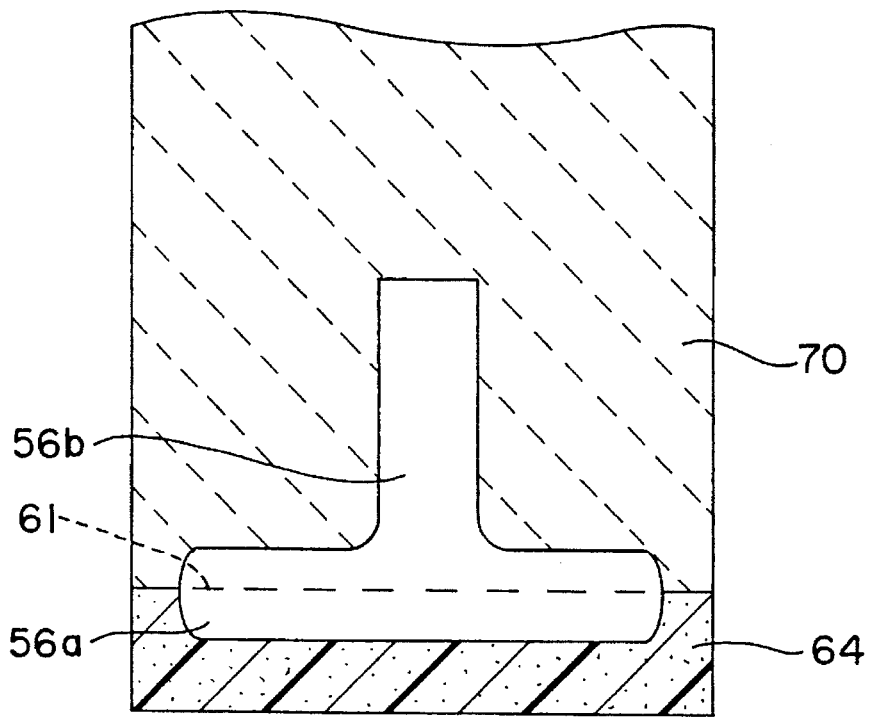

Referring to FIG. 3E, a second layer of mold material 70 has been deposited on the first layer of mold material 64 such that the second layer of mold material 74 completely covers the second three-dimensional section 56b. As seen from the cross hatching in the region representing second mold material layer 70, that layer is shown to be of a composition differing from that of the first mold material layer 64. Differing compositions between mold material layers may not always be necessary; however, conditions may require differing compositions in some instances, and the process and apparatus of the present invention provides the flexibility to accomplish deposition of differing compositions. For instance, the composition of the first mold material layer 64 may be that of a water soluble wax, while that of second mold material layer 70 may be a ceramic. To provide a further example, first mold material layer 64 may be one formulation of a ceramic, while the second mold material layer 70 may be another formulation of a ceramic. Any differing composition may be used for a mold material layer, so long as that composition possesses the desirable properties discussed previously and so long as that composition is compatible with the construction material which will interface with it. The term "compatible", as used herein to describe relationship between mold and construction materials, generally means that removal of mold material interfacing with a given section of construction material will not damage or impair that construction material section.

Figure 3F:
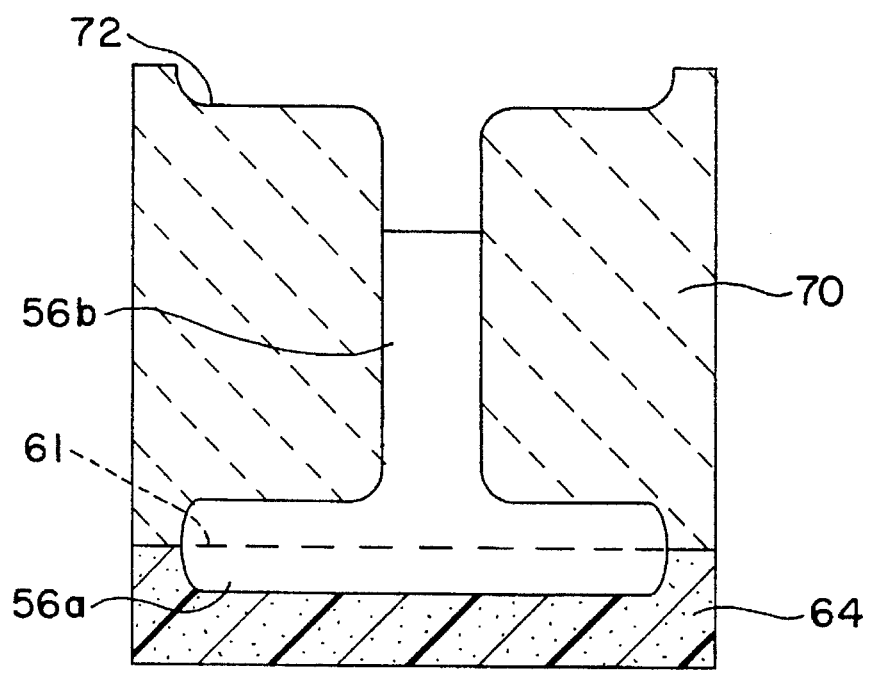

FIG. 3F illustrates a second cavity 72 as having been machined into the second mold material layer 70.

Figure 3G:
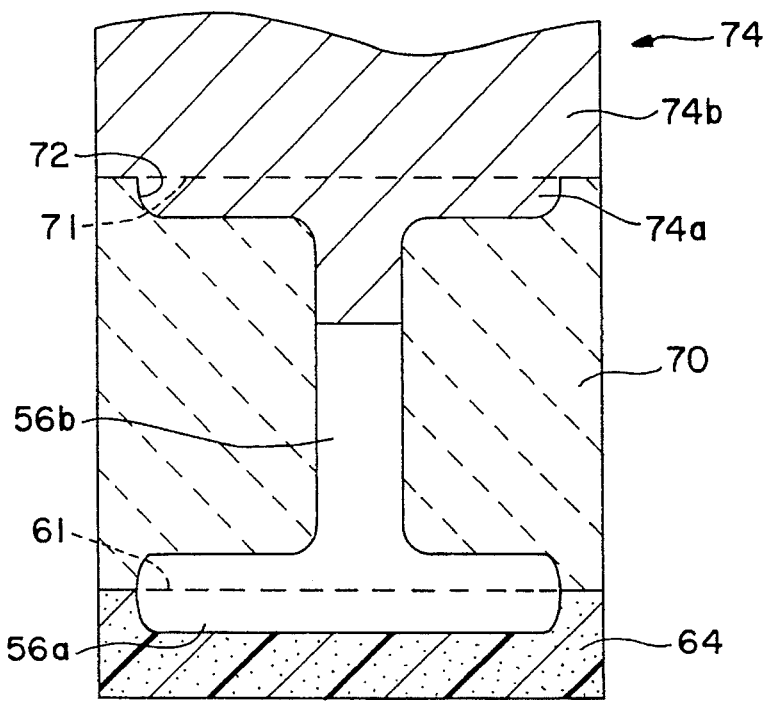

In FIG. 3G, a second layer of construction material 74 has been deposited onto the second layer of mold material 70 such that an overlapping portion 74b of second construction material layer 74 fills second cavity 72 to form the third three-dimensional section 56c of object 56 (FIG. 3A) and such that a superposing portion 74b of layer 74 covers the second layer of mold material 70. An imaginary line 71 is shown for purposes of illustration to divide the second construction material layer 74 into the portions 74a, 74b. As shown by the shading in the area representing the second layer of construction material 74, that layer is of a composition differing from that of the first layer of construction material 68 (FIG. 3C), from which the first and second three-dimensional sections 56a, 56b have been formed. For example, the first layer of construction material 68 may be a machinable wax, as previously indicated, while the second layer of construction material 74 may be an epoxy or a photopolymer. Consequently, the finished object 56 may be comprised of non-homogenous material. Various compositions may be used for a construction materials, so long as such compositions are sufficiently machinable when in solid form and so long as they are compatible with the surrounding mold material.

Figure 3H:
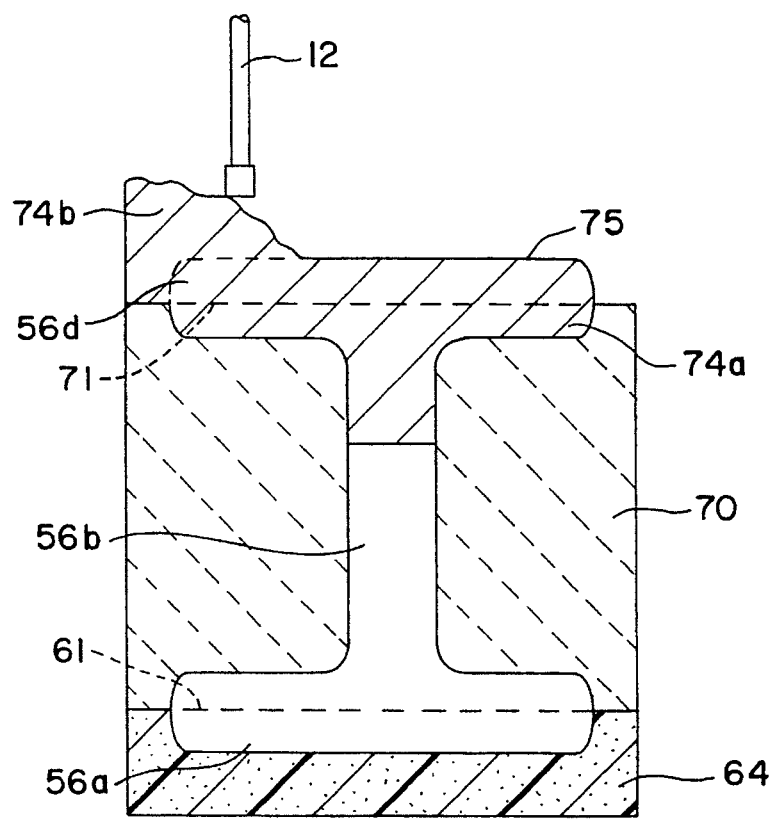

FIG. 3H depicts sculpting means 12 machining superposing portion 74b of the second construction material layer 74, thereby forming the fourth three-dimensional section 56d of object 56. The outline of the portion of section 56d yet to be formed in FIG. 3H is shown in phantom lines. Further machining may be performed, if necessary, to level the top surface 75 of section 56d. Following the step shown in FIG. 3H or any such final machining, the mold material layers 64, 70 may be removed by any of the techniques discussed with regard to FIG. 2F which are suitable for the particular mold material compositions used. The removal of the mold material layers exposes the completed object 56 (FIG. 3).

Figure 4:
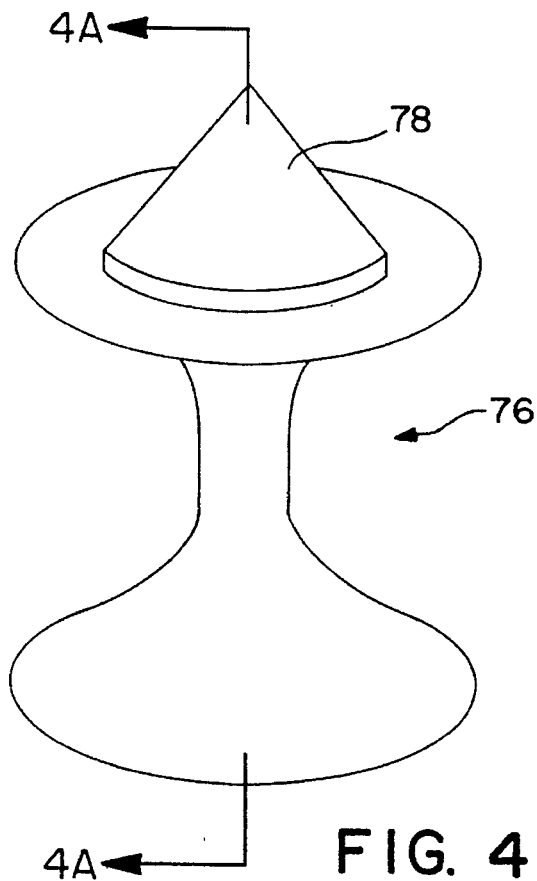
FIG. 4 is a perspective view of a three-dimensional object varying slightly from that shown in FIGS. 3 & 3A.
Figure 4A:
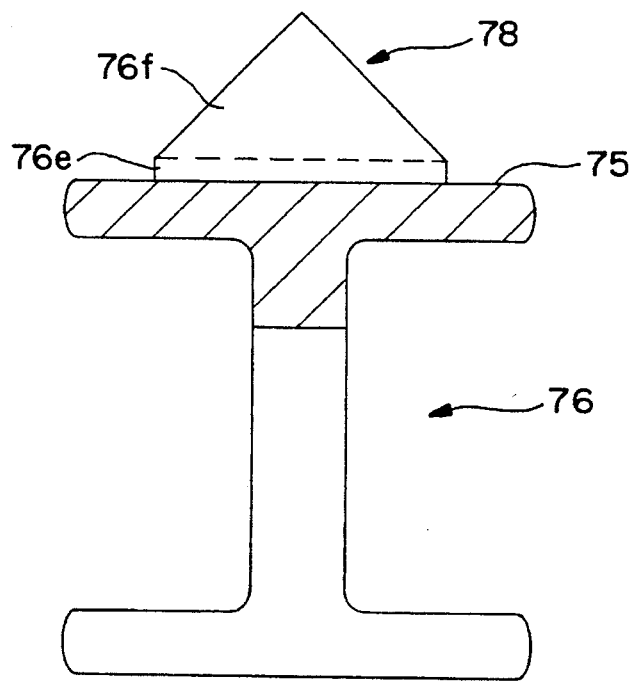
FIG. 4A is a sectional elevation view taken along line 4A—4A of FIG. 4.

The steps described with regard to FIGS. 3B–3H may be sequentially repeated to produce additional three-dimensional sections until a larger object is completely formed. For instance, FIGS. 4 & 4A illustrate another three-dimensional object 76 which is comprised of object 56 (FIG. 3) and a raised inverted conical member 78 disposed upon upper surface 75. Member 78 is subdivided into two three-dimensional sections which, since object 56 was shown to have four sections, are fifth and sixth three-dimensional sections of object 76, namely fifth three-dimensional section 76e and sixth three-dimensional section 76f. As with object 56, the thickness and placement of these sections are parameters which are programmed into CAD/CAM system 136 of computer 30 (FIG. 1), the parameters being variable as previously described.

Figure 4B:
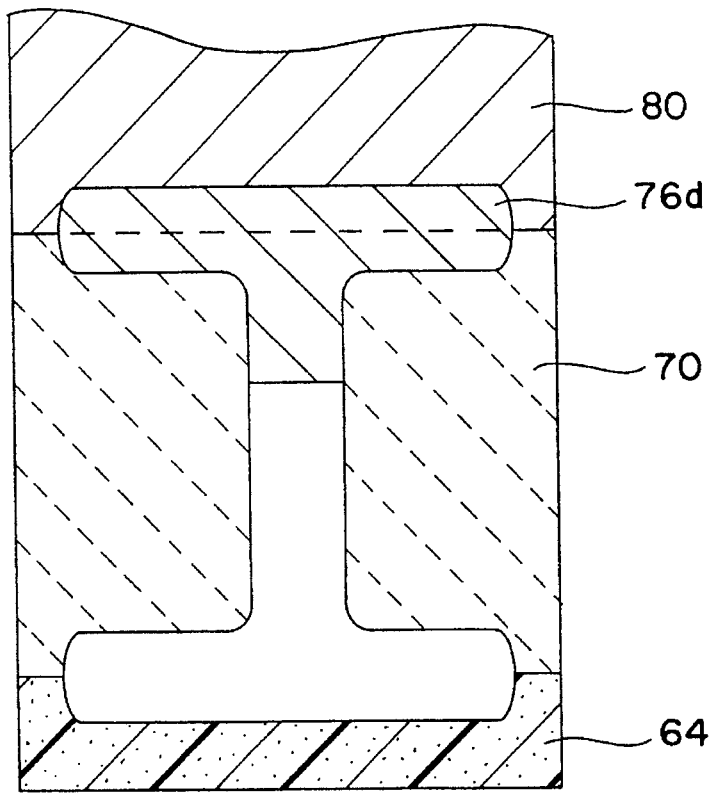
FIGS. 4B–4E illustrate successive stages in the production of the object illustrated in FIGS. 4 & 4A according to the method of the present invention, said stages being in addition to the stages illustrated in FIGS. 3B–3H.

In FIG. 4B, a successive layer of mold material is shown to have been deposited onto an immediately preceding three-dimensional section. Specifically, a third layer of mold material 80 is deposited onto the second layer of mold material 70, and layer 80 is seen to completely cover the immediately preceding completed three-dimensional section 76d (corresponding to section 56d in FIG. 3A).

Figure 4C:
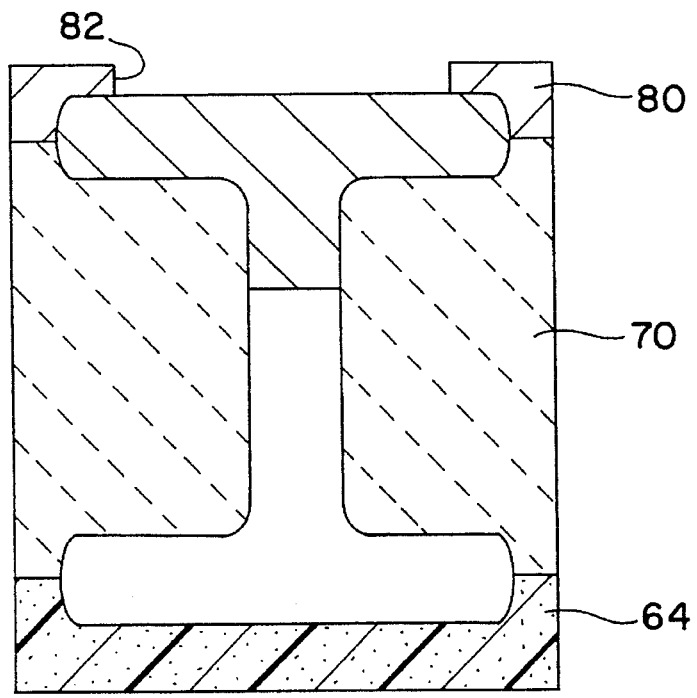

FIG. 4C illustrates a corresponding cavity 82 as having been machined into the third layer of mold material 80.

Figure 4D:
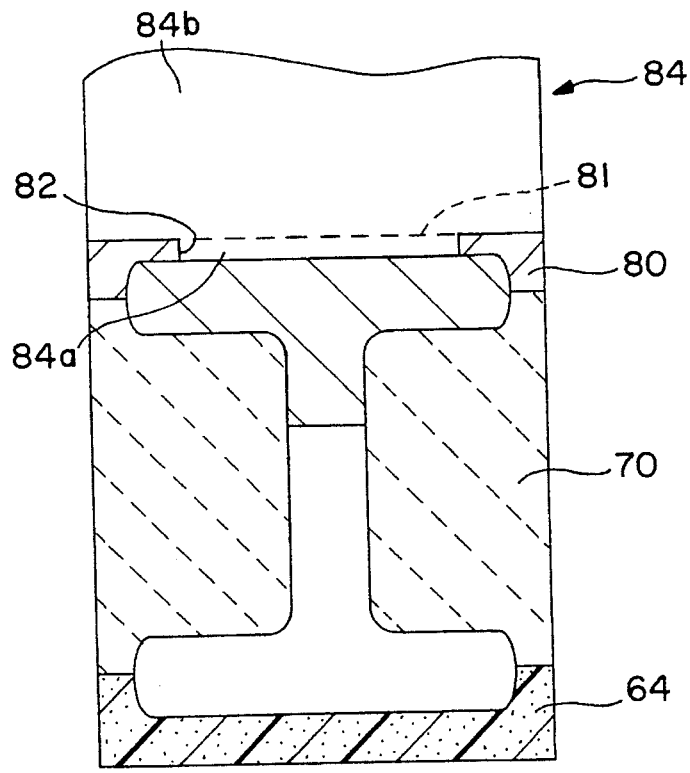

In FIG. 4D, a successive layer of construction material is shown to have been deposited onto the successive layer of mold material. Specifically, a third layer of construction material 84 has been deposited onto third layer of mold material 80 such that an overlapping portion 84a of layer 84 fills the corresponding cavity 82 to form fifth three-dimensional section 76d and such that a superposing portion 84b of layer 84 covers the third layer of mold material 80.

Figure 4E:
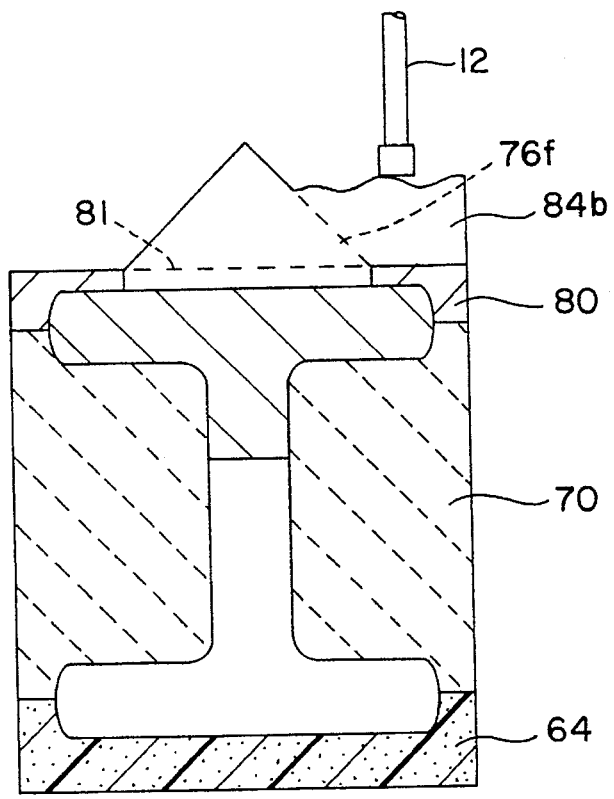

FIG. 4E depicts sculpting means 12 machining superposing portion 84b of the third construction material layer 84, thereby forming the sixth three-dimensional section 76f. The outline of the portion of section 76f yet to be formed in FIG. 4E is shown by a phantom line. Following any necessary final surfacing and removal of mold material layers 64, 70, and 80, the completed object 76 (FIGS. 4 & 4A) emerges.

The process of the present invention may also be used to produce hollow three-dimensional objects, the term "hollow" including any finished three-dimensional object which possesses at least one void at any point within its volume.

Figure 5:
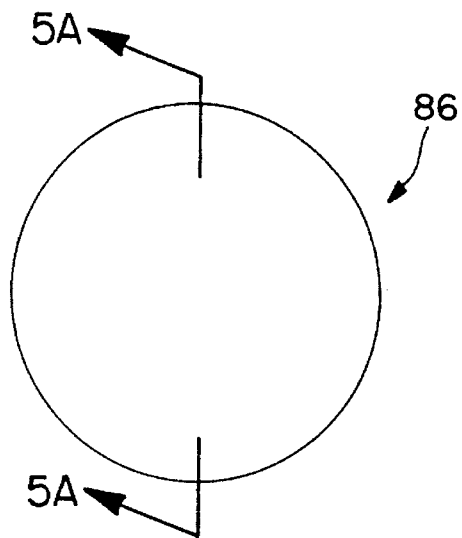
FIG. 5 is a perspective view of a hollow sphere.
Figure 5B:
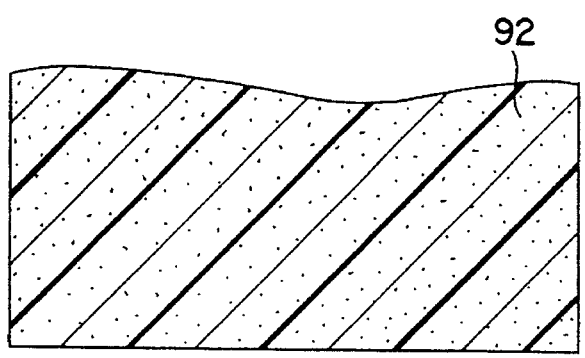
FIGS. 5B–5I illustrate successive stages in the production of the object illustrated in FIGS. 5 & 5A according to the method of the present invention.
Figure 5A:
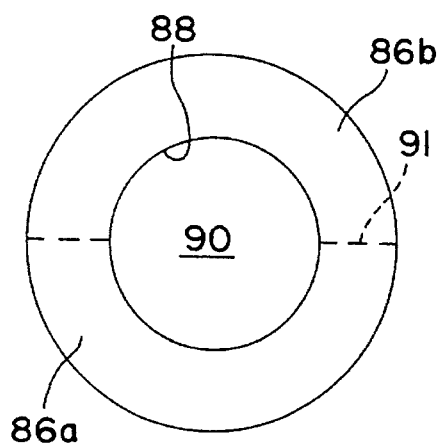
FIG. 5A is a sectional elevation view taken along line 5A—5A of FIG. 5.

FIGS. 5 & 5A illustrate a hollow sphere 86 comprised of first and second three-dimensional hollow sections 86a and 86b, respectively, which are demarcated by an imaginary line 91. The internal walls of sections 86a, 86b form an enclosure 88 to define a void 90.

Figure 5C:
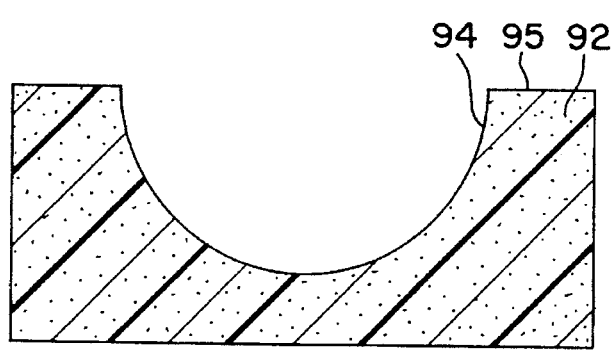

FIGS. 5B & 5C, one layer of mold material 92 has been deposited, and a first cavity 94 has been formed into layer 92. Moreover, excess mold material is machined away so that mold material layer 92 has level upper surfaces such as at 95.

Figure 5D:
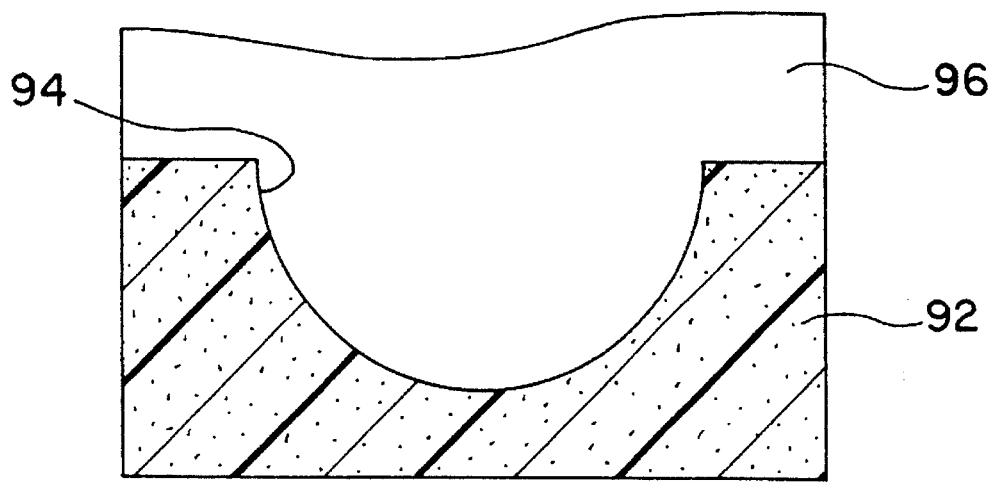

FIG. 5D illustrates one layer of construction material 96 having been deposited onto mold material layer 92 such that layer 96 fills the first cavity 94.

Figure 5E:
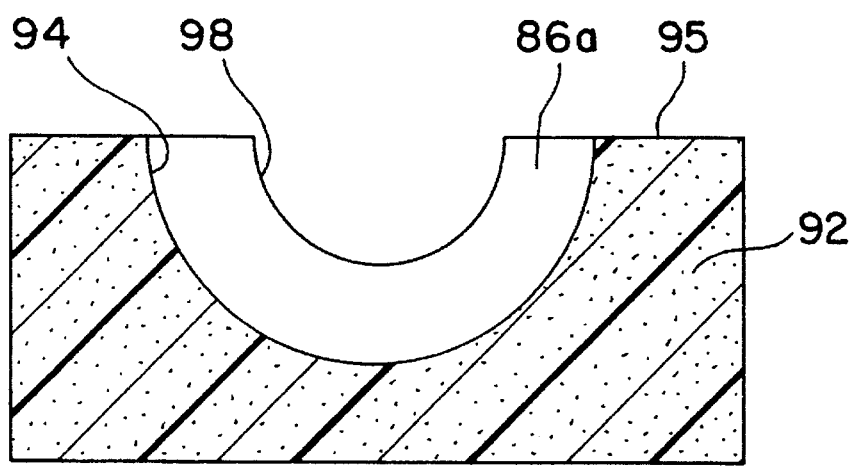

In FIG. 5E, construction material from layer 96 which was above the elevation of surface 95 has been removed. Furthermore, a second cavity 98 has been machined into the remaining construction material layer 96 to form first hollow three-dimensional section 86a of hollow sphere 86.

Figure 5F:
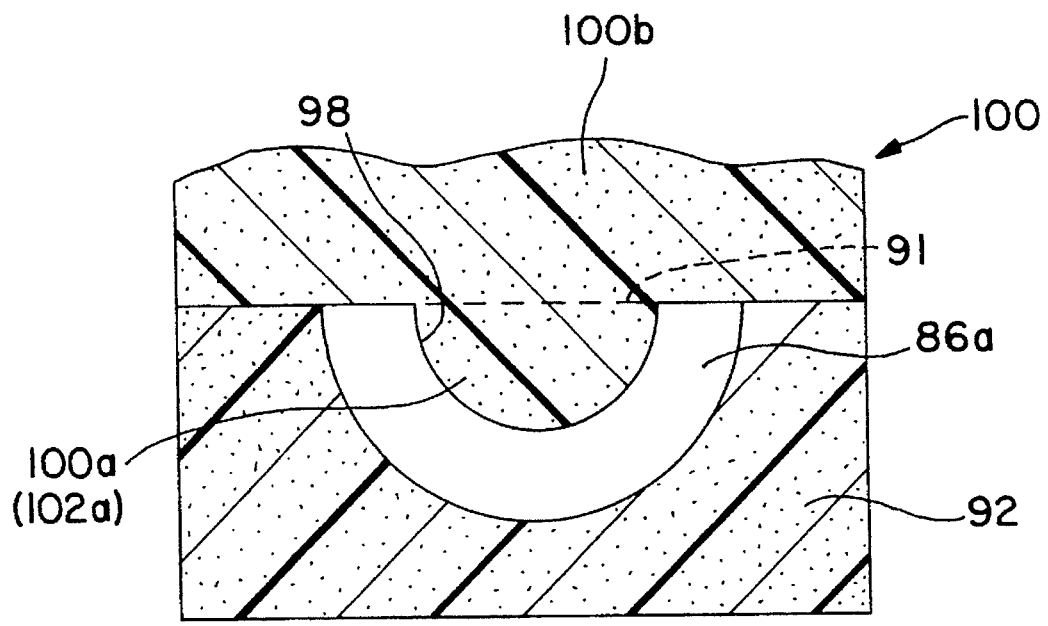

FIG. 5F illustrates another layer of mold material 100 having been deposited onto the one mold material layer 92 such that an overlapping portion 100a of layer 100 fills the second cavity 98 to form a first portion 102a of a void negative and such that a superposing portion 100b of layer 100 covers layer 92 and the first three-dimensional hollow section 86a. Imaginary line 91 divides the mold material layer 100 into the portions 100a, 100b.

Figure 5G:
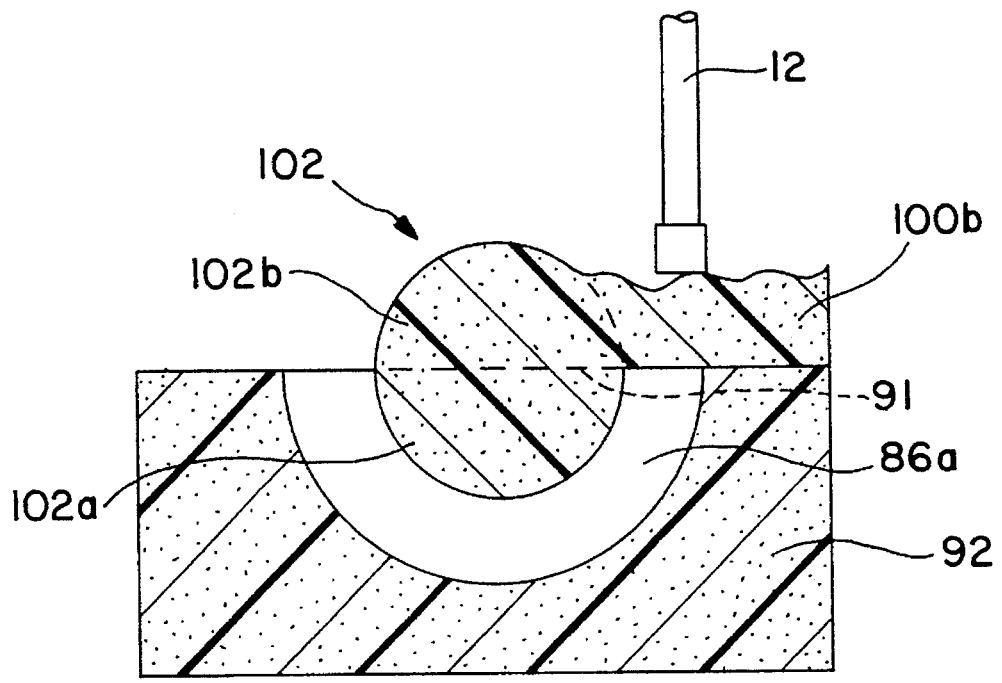

FIG. 5G depicts sculpting means 12 machining superposing portion 100b of the mold material layer 100, thereby forming a second portion 102b the void negative 102. The outline of the portion of void negative 102 yet to be formed in FIG. 4E is shown by a phantom line.

Figure 5H:
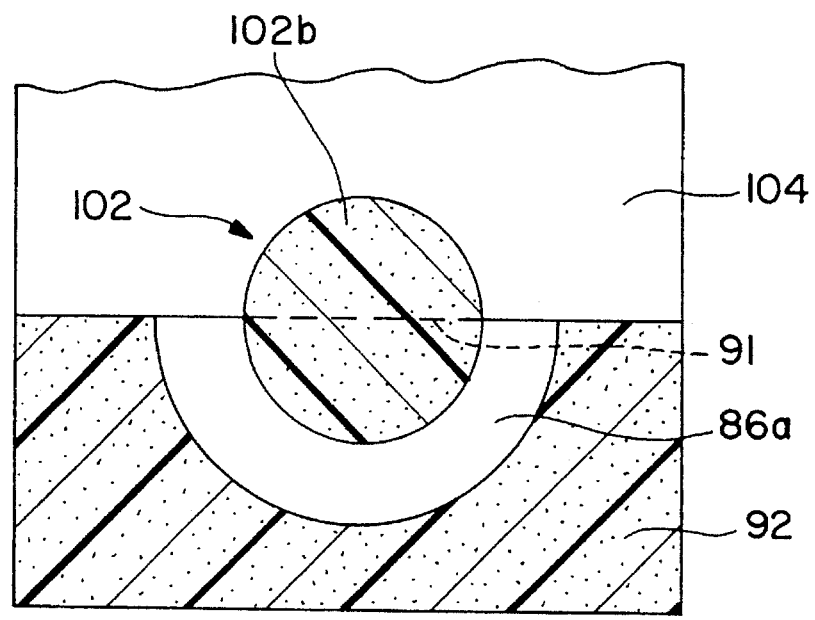

In FIG. 5H, another layer of construction material 104 has been deposited onto the one layer of mold material 92 such that the layer of construction material 104 completely covers the second portion 102b of void negative 102.

Figure 5I:
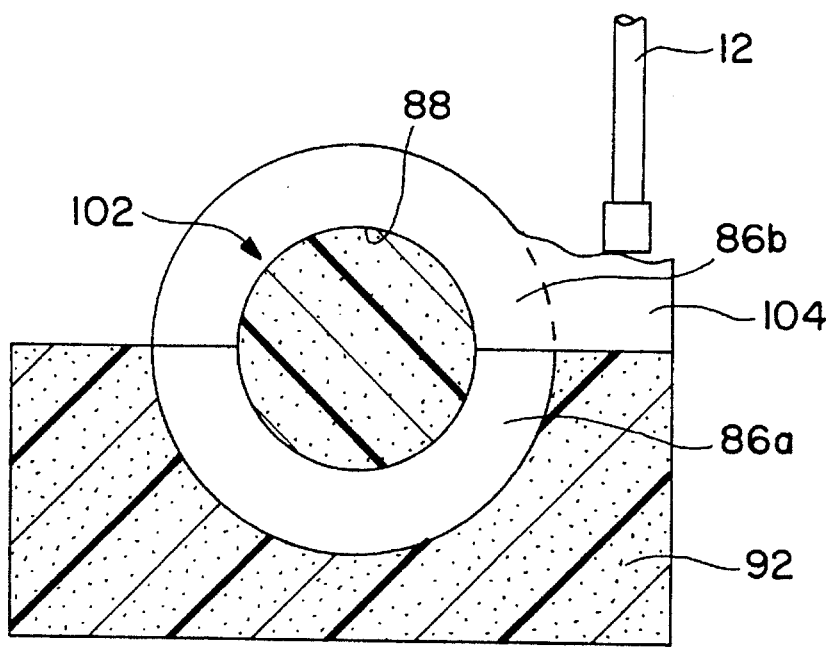

Referring to FIG. 5I, layer of construction material 104 is shown being machined by sculpting means 12 to form the second three-dimensional hollow section 86b of hollow sphere 86. The outline of the portion of section 86b yet to be formed in FIG. 5I is shown by a phantom line. It is seen that hollow sections 86a, 86b form the enclosure 88 encapsulating the void negative 102.

Figure 5J:
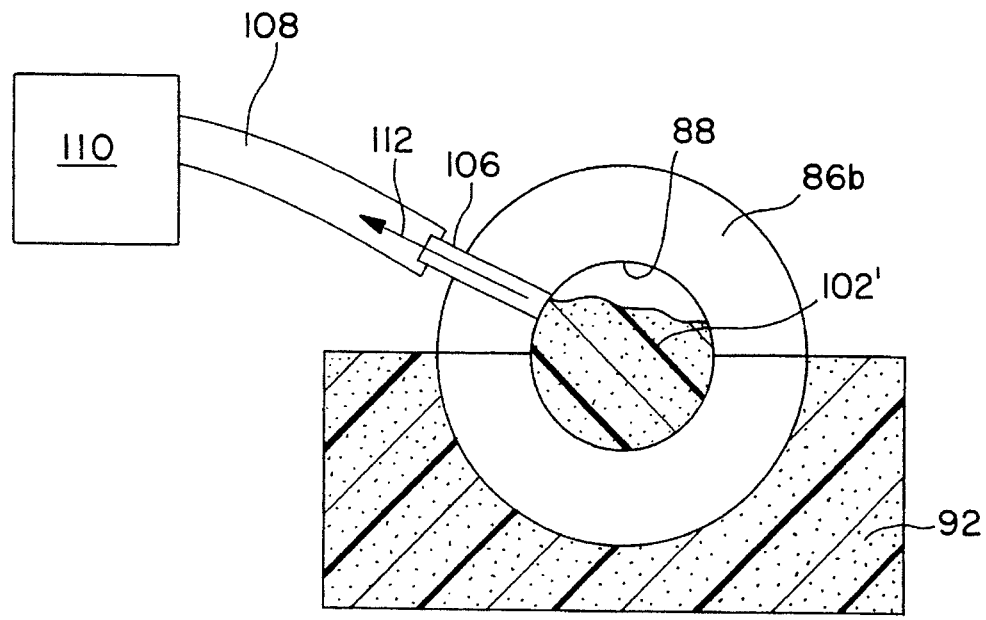
FIGS. 5J & 5K illustrate alternative methods of removing a void negative.
Figure 5K:
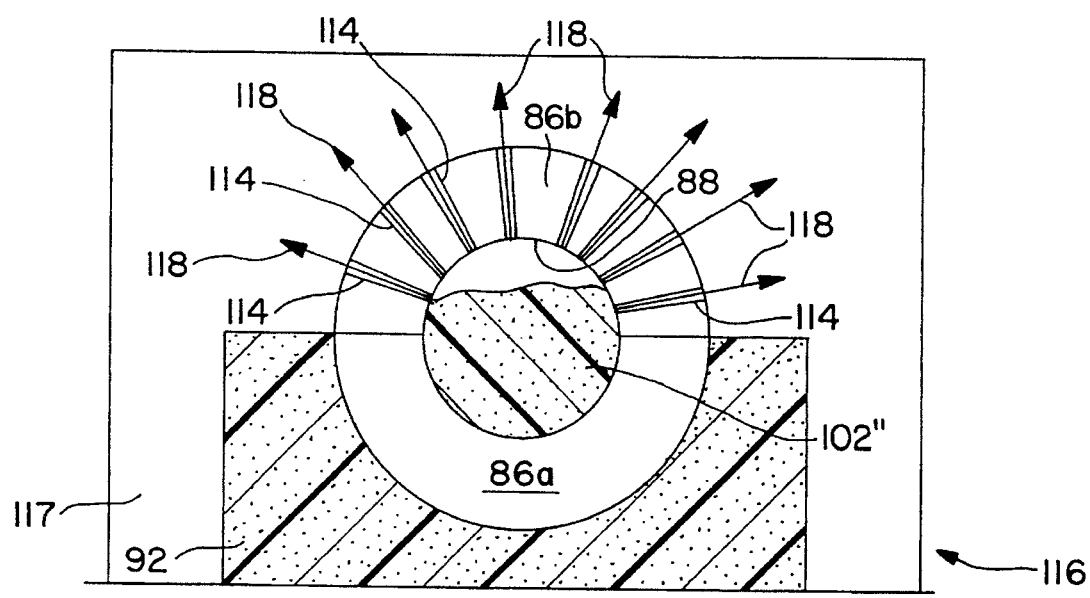

FIGS. 5J & 5K disclose alternative methods of removing void negative 102 from enclosure 88 so as to produce the void 90 (FIG. 5A).

In FIG. 5J, a vent 106 is shown as having been inserted through second three-dimensional hollow section 86b. A conduit 108 communicates with the outlet of vent 106 at one end and with a vacuum source 110 at another end. Activation of source 110 causes the void negative material 102', which must be in a liquid or gaseous state, to escape from enclosure 88 in the direction indicated by arrow 112. If necessary, the void negative 102 may be partially dissolved prior to evacuation. Such dissolution may be effected by a solvent which, depending upon the composition of the void negative 102, may be such liquids as water or kerosene.

In FIG. 5K, which illustrates a thermal method of void negative removal, a different void negative material 102" is shown, since for such a method the material 102" must have a lower melting point than the material comprising mold material layer 92. Moreover, FIG. 5K illustrates the second three-dimensional hollow section 86b as having been formed of a porous material, such as a porous ceramic, as shown by a plurality of pores 114, the relative diameters of which are exaggerated for purposes of illustration. The hollow sphere sections 86a & 86b, mold material layer 92, and the material 102" are subjected to a heated environment such as that defined by enclosure 116. Heating continues, causing material 102" to boil and reach a vapor state, whereafter the vapor escapes through the plurality of pores 114 and into the environment 117 in the manner indicated by arrows 118.

Void negative 102 may also be removed by a modified process including steps illustrated with respect to both FIG. 5J & 5K. Specifically, a heated environment may liquify the void negative 102, whereafter the material is evacuated via a vent though a three-dimensional section.

For purposes other than that shown in FIG. 5K, environment 117 need not be limited to a heated environment. For illustrative examples, it may be advantageous to cool that environment so as to cause rapid solidification of waxes or to flood the environment with an inert gas to prevent unwanted byproducts from process steps performed upon mold or construction material.

Figure 6:
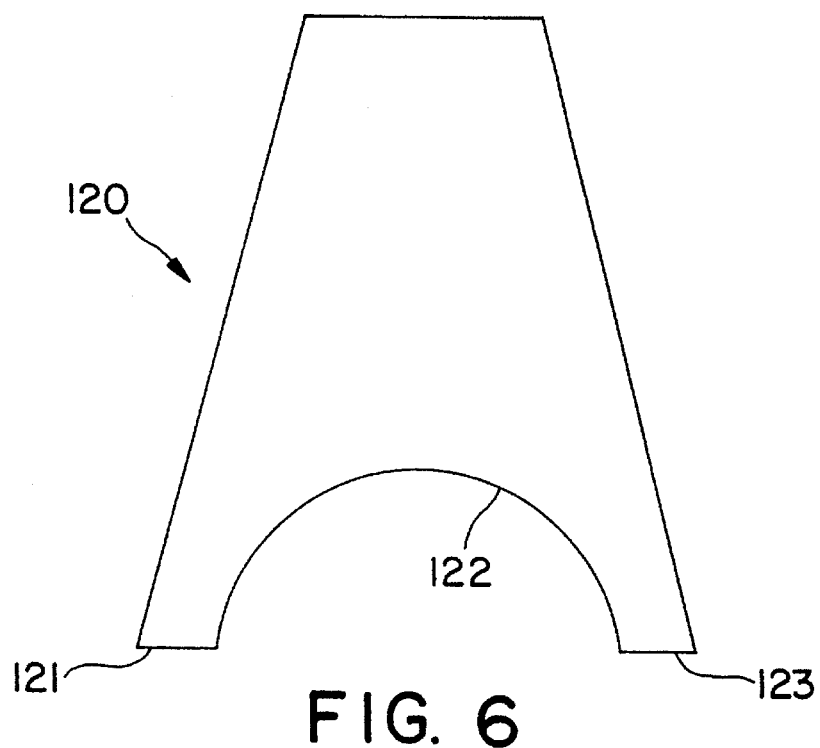
FIG. 6 is a sectional elevation view of a three-dimensional object having a recessed surface.

The process of the present invention may also be used to produce a three-dimensional object having a recessed surface, such as the object depicted in cross section in FIG. 6, where a three-dimensional object 120 is shown having a recessed surface 122. Surface 122 forms an arcuate indentation with respect to the plane containing either or both of lower planar surfaces 121 and 123. The sequential steps executed to produce object 120 are described below.

Figure 6A:
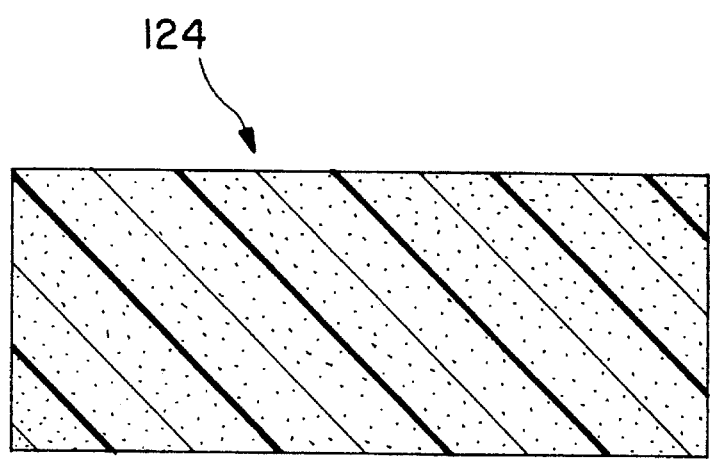
FIGS. 6A–6E illustrate successive stages in the production of the object illustrated in FIG. 6 according to the method of the present invention.

FIG. 6A illustrates a layer of mold material 124 as having been deposited.

Figure 6B:
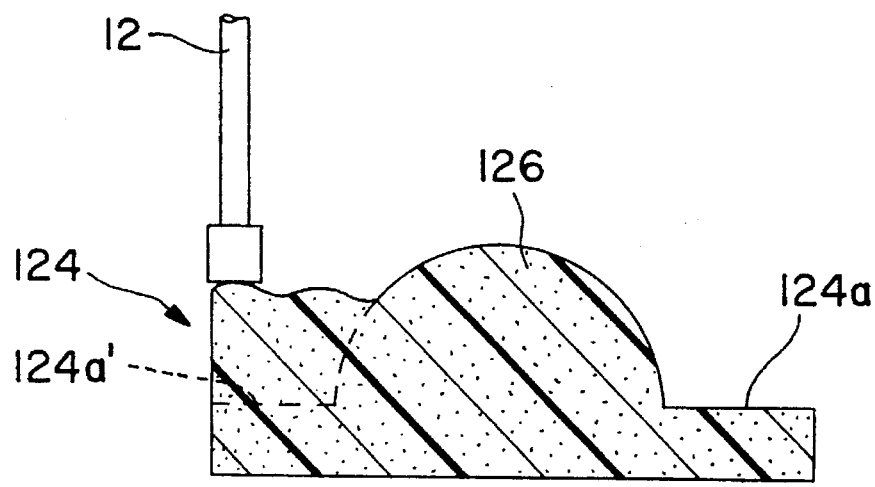

FIG. 6B depicts sculpting means 12 machining the mold material layer 124 to form a protuberance 126 which, though shown as having a rounded or hemispherical shape, can assume any shape, depending on the shape of the corresponding recessed surface in the object to be produced. In FIG. 6B, protuberance 126 thrusts outwardly with respect to surrounding upper planar surfaces 124a, 124a' formed by the machining of layer 124. The outline of the portion of protuberance 126 yet to be formed in FIG. 6B is shown by phantom lines.

Figure 6C:
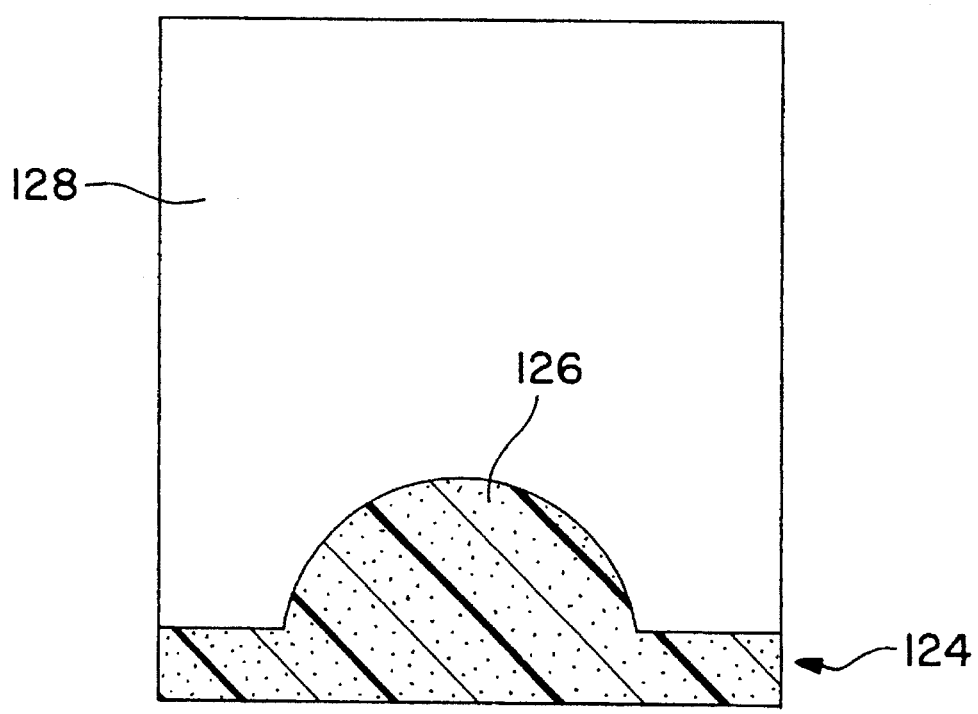

In FIG. 6C, a layer of construction material 128 is shown as having been deposited onto the layer of mold material 126 such that layer 128 is seen to completely cover protuberance 126.

Figure 6D:
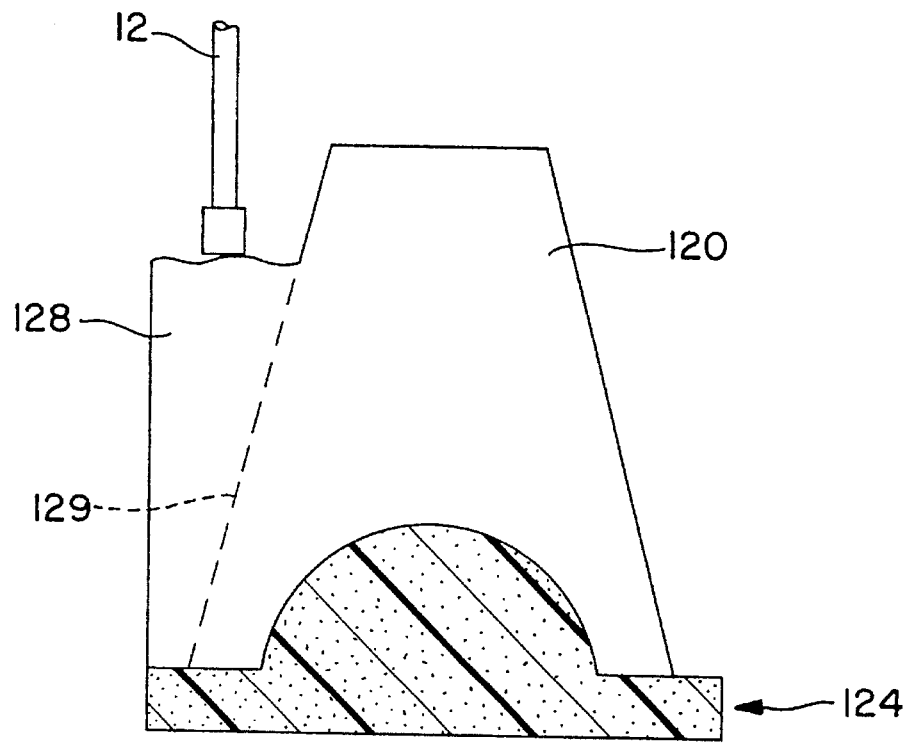

As seen in FIG. 6D, machining of the construction material layer 128 by sculpting means 12 then occurs such that object 120 begins to emerge, the uncompleted portion of which is represented by phantom line 129.

Figure 6E:
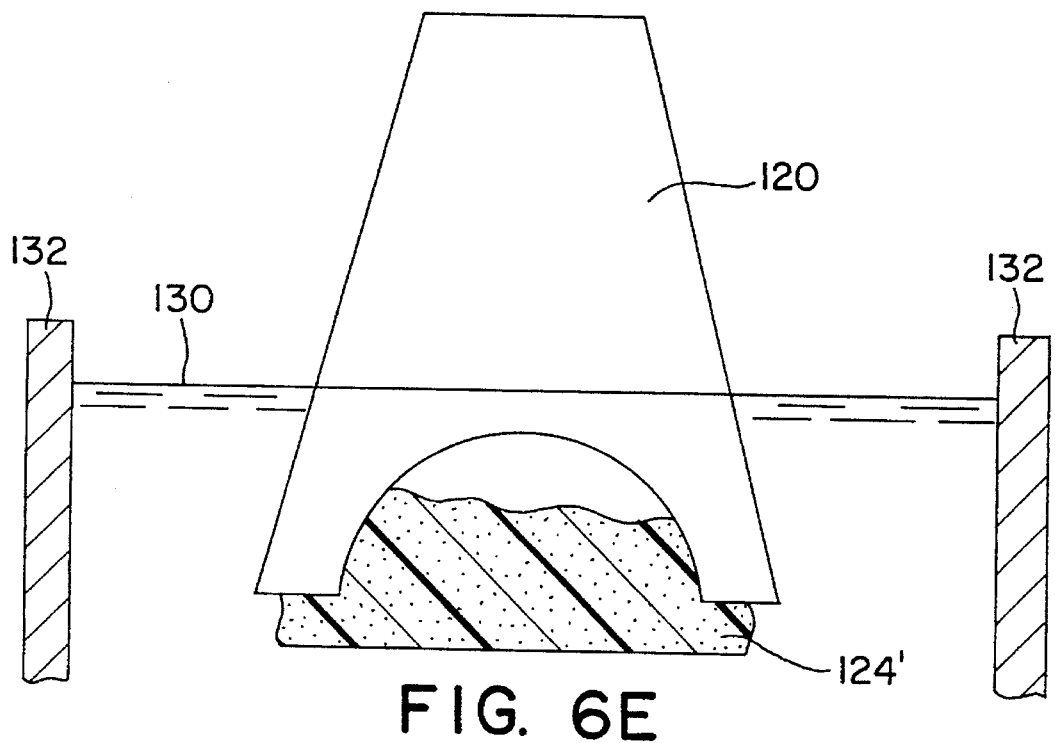

FIG. 6E depicts the removal of machined mold material layer 124. Mold material layer 124 is submerged into a solvent 130, which is contained in vessel walls 132 and which may be water if the mold material is a water-soluble wax. As seen in FIG. 6E, former layer 124 is shown as having been partially dissolved into a material mass 124'. Continued submersion results in complete removal of the mold material. It is to be again understood that mold material removal may take place by any of the techniques discussed with regard to FIG. 2F which are suitable for the particular mold material compositions used.

Due to the shape of object 120, in which no overhangs are present, only one application and machining of a construction material layer need occur, such that the only three-dimensional section produced is the entire object 120 itself. It will be appreciated, however, that objects of different configurations, such as those with both overhangs and a recessed surface, can be produced by a combination of the steps described with respect to FIGS. 6A–6E and preceding figures such that a plurality of three-dimensional As the foregoing description is merely exemplary in nature, being merely illustrative of the invention, many variations will become apparent to those of skill in the art. It is to be particularly understood that the process steps respectively described in FIGS. 2A–2F, 3B–3H, 4B–4E, 5B–5K, and 6A–6E may be combined in any sequence to produce three-dimensional objects possessing widely varying external and internal configurations. Such variations are included within the spirit and scope of this invention as defined by the following appended claims.

That which is claimed:

1. A method of producing a three-dimensional object comprising the steps of:
   depositing a first layer of mold material onto a support surface;
   machining a first cavity into said first layer of mold material;
   depositing a first layer of construction material onto said first layer of mold material such that an overlapping portion of said first layer of construction material fills said first cavity to form a first three-dimensional section of said object and such that a superposing portion of said first layer of construction material covers said first layer of mold material; and
   machining said superposing portion of said first layer of construction material to form a second three-dimensional section of said object.

2. The method set forth in claim 1 further comprising the steps of:
   depositing a second layer of mold material, said second layer of mold material covering said second three-dimensional section of said object; and
   machining a second cavity into said second layer of mold material.

3. The method set forth in claim 2 further comprising the step of filling said second cavity with construction material to form a third three-dimensional section of said object.

4. The method set forth in claim 2 further comprising the steps of:
   depositing a second layer of construction material onto said second layer of mold material such that an overlapping portion of said second layer of construction material fills said second cavity to form a third three-dimensional section of said object and such that a superposing portion of said second layer of construction material covers said second layer of mold material; and
   machining said superposing portion of second layer of construction material to form a fourth three-dimensional section of said object.

5. The method set forth in claim 4 wherein a composition of one layer of mold material differs from a composition of another layer of mold material.

6. The method set forth in claim 4 wherein a composition of one layer of construction material differs from a composition of another layer construction material.

7. The method set forth in claim 4 further comprising the steps of:
   depositing a successive layer of mold material onto an immediately preceding three-dimensional section of said object;
   machining a corresponding cavity into said successive layer of mold material;
   depositing a successive layer of construction material onto said successive layer of mold material such that an overlapping portion of said successive layer of construction material fills said corresponding cavity to form another three-dimensional section of said object and such that a superposing portion of said successive layer of construction material covers said successive layer of mold material;
   machining said superposing portion of said successive layer of construction material to form yet another three-dimensional section of said object; and
   repeating said steps of depositing a successive layer of mold material onto an immediately preceding three-dimensional section of said object, machining a corresponding cavity into said successive layer of mold material, depositing a successive layer of construction material, and machining said superposing portion until said object is completely formed.

8. The method set forth in claim 7 wherein a composition of one layer of mold material differs from a composition of another layer of mold material.

9. The method set forth in claim 7 wherein a composition of one layer of construction material differs from a composition of another layer construction material.

10. A method of producing a hollow three-dimensional object, comprising the steps of:
    depositing one layer of mold material;
    machining a first cavity into said one layer of mold material;
    filling said first cavity with one layer of construction material;
    machining a second cavity into said one layer of construction material to form a first three-dimensional hollow section of said object;
    depositing another layer of mold material onto said one layer of mold material such that an overlapping portion of said another layer of mold material fills said second cavity to form a first portion of a void negative and such that a superposing portion of said another layer of mold material covers said first three-dimensional hollow section;
    machining said superposing portion of said another layer of mold material to form a second portion of said void negative;

depositing another layer of construction material, said another layer of construction material covering said second portion of said void negative;

machining said another layer of construction material to form a second three-dimensional hollow section of said object, whereby said first and second three-dimensional hollow sections form an enclosure about said void negative; and removing said void negative from said enclosure.

11. The method set forth in claim 10 wherein said step of removing said void negative from said enclosure includes the steps of:

providing a vent through at least one of said three-dimensional hollow sections; and causing mold material comprising said void negative to escape through said vent.

12. The method set forth in claim 10 wherein said step of removing said void negative from said enclosure includes the steps of:

constructing at least one of said three-dimensional hollow sections from a composition into which a plurality of pores form upon curing of said composition; and causing mold material comprising said void negative to escape through said plurality of pores.

13. A method of producing a three-dimensional object having a recessed surface comprising the steps of:

depositing a layer of mold material;

machining said layer of mold material to form a protuberance;

depositing a layer of construction material onto said layer of mold material; and machining said layer of construction material to form a three-dimensional section of said object.

14. The method set forth in claim 13 further comprising the step of removing said mold material layer following said machining of said layer of construction material.

* * * * *